(12) United States Patent
Son et al.

(10) Patent No.: US 12,099,131 B2
(45) Date of Patent: Sep. 24, 2024

(54) APPARATUS AND METHOD FOR ESTIMATING DIRECTION OF SOUND BY USING ACOUSTIC SENSOR

(71) Applicant: SAMSUNG ELECTRONICS CO., LTD., Suwon-si (KR)

(72) Inventors: Daehyuk Son, Suwon-si (KR); Cheheung Kim, Yongin-si (KR); Jaehyung Jang, Anyang-si (KR); Hyeokki Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 206 days.

(21) Appl. No.: 17/834,176

(22) Filed: Jun. 7, 2022

(65) Prior Publication Data
US 2023/0194646 A1    Jun. 22, 2023

(30) Foreign Application Priority Data
Dec. 20, 2021    (KR) ......................... 10-2021-0183130

(51) Int. Cl.
*G01S 3/803*    (2006.01)
*H04R 1/40*     (2006.01)
*H04R 3/00*     (2006.01)

(52) U.S. Cl.
CPC ............ *G01S 3/8038* (2013.01); *H04R 1/406* (2013.01); *H04R 3/005* (2013.01); *H04R 2201/401* (2013.01); *H04R 2430/21* (2013.01)

(58) Field of Classification Search
CPC .......... G01S 3/8038; G01S 3/801; G01S 5/20; G01S 11/14; H04R 1/406; H04R 3/005; H04R 2201/401; H04R 2430/21
See application file for complete search history.

(56) References Cited

U.S. PATENT DOCUMENTS 5,856,722 A    1/1999  Haronian et al.
7,672,196 B1   3/2010  Hanyu
(Continued)

FOREIGN PATENT DOCUMENTS

CN    112118515 A  * 12/2020  ............. G01H 3/005
EP    3755004 A1   * 12/2020  ............. G01H 3/005
(Continued)

OTHER PUBLICATIONS

Jean-March Valin et al., "Robust Sound Source Localization Using a Microphone Array on a Mobile Robot", Proceedings of the 2003 IEEE/RSJ, 2003, 6 pages.
(Continued)

*Primary Examiner* — Akelaw Teshale
(74) *Attorney, Agent, or Firm* — Sughrue Mion, PLLC

(57) ABSTRACT

Provided is a direction estimating apparatus using an acoustic sensor, the direction estimating apparatus including a non-directional acoustic sensor, a plurality of directional acoustic sensors provided adjacent to the non-directional acoustic sensor, and a processor configured to obtain a first output signal from the non-directional acoustic sensor and a plurality of second output signals from the plurality of directional acoustic sensors, and estimate a direction of a sound source within an error range from −5 degrees to +5 degrees by comparing magnitudes between the two output signals and phase information between the first output signal and one of the second output signals.

20 Claims, 26 Drawing Sheets

(56) References Cited

U.S. PATENT DOCUMENTS

| | | | |
|---|---|---|---|
| 8,103,027 B2 | 1/2012 | Zhang et al. | |
| 8,170,244 B2 | 5/2012 | Ryan et al. | |
| 9,148,729 B2 | 9/2015 | Josefsson | |
| 9,197,974 B1* | 11/2015 | Clark | H04R 29/004 |
| 10,141,007 B1 | 11/2018 | Kim et al. | |
| 10,334,390 B2* | 6/2019 | Bakish | H04R 1/406 |
| 2016/0050506 A1 | 2/2016 | Kim et al. | |
| 2016/0071526 A1* | 3/2016 | Wingate | G01S 3/807 |
| | | | 704/233 |
| 2017/0026741 A1* | 1/2017 | Yoshino | H04R 1/406 |
| 2018/0097506 A1 | 4/2018 | Kang et al. | |
| 2018/0130485 A1 | 5/2018 | Park et al. | |
| 2018/0138886 A1 | 5/2018 | Yoon et al. | |
| 2019/0014422 A1* | 1/2019 | Lunner | H04R 25/554 |
| 2019/0033904 A1 | 1/2019 | Hong et al. | |
| 2019/0072635 A1 | 3/2019 | Kang et al. | |
| 2019/0174244 A1* | 6/2019 | Kim | H04S 7/30 |
| 2019/0348050 A1 | 11/2019 | Kim et al. | |
| 2020/0204187 A1 | 6/2020 | Hong et al. | |
| 2020/0236464 A1* | 7/2020 | Kang | H04R 1/406 |
| 2022/0132263 A1* | 4/2022 | Kim | H04R 5/027 |
| 2022/0326366 A1* | 10/2022 | Shimizu | G01S 3/805 |
| 2022/0408180 A1* | 12/2022 | Lepoutre | G01S 5/22 |
| 2023/0103757 A1 | 4/2023 | Kim et al. | |
| 2023/0197084 A1* | 6/2023 | Jang | G01S 3/802 |
| | | | 704/235 |

FOREIGN PATENT DOCUMENTS

| | | | | |
|---|---|---|---|---|
| EP | 3849210 A1 * | 7/2021 | | H04R 17/02 |
| JP | 3440414 B2 | 8/2003 | | |
| JP | 4193041 B2 | 12/2008 | | |
| JP | 5004276 B2 | 8/2012 | | |
| KR | 10-1354960 B1 | 1/2014 | | |
| KR | 10-2020-0021780 A | 3/2020 | | |
| WO | WO-2021064468 A1 * | 4/2021 | | G01S 3/8036 |

OTHER PUBLICATIONS

Samir N. Y. Gerges et al., "State of the Art Beamforming Software and Hardware for Applications", ICSV16, 2009, 22 pages.

* cited by examiner

APPARATUS AND METHOD FOR ESTIMATING DIRECTION OF SOUND BY USING ACOUSTIC SENSOR

CROSS-REFERENCE TO RELATED APPLICATION

This application claims priority to Korean Patent Application No. 10-2021-0183130, filed on Dec. 20, 2021, in the Korean Intellectual Property Office, the disclosure of which is incorporated by reference herein in its entirety.

BACKGROUND

1. Field

Example embodiments of the present disclosure relate to apparatuses and methods for estimating a direction by using an acoustic sensor.

2. Description of Related Art

Acoustic sensors, which are mounted in household appliances, image display devices, virtual reality devices, augmented reality devices, artificial intelligence speakers, and the like to detect a direction from which sounds are coming and recognize voices, are used in increasingly more areas. Recently, a directional acoustic sensor that detects sound by converting a mechanical movement due to a pressure difference, into an electrical signal has been developed.

SUMMARY

One or more example embodiments provide apparatuses and methods for estimating a direction by using an acoustic sensor. The technical objective to be achieved by the present embodiment is not limited to the above technical objectives, and other technical objectives may be inferred from the example embodiments below.

Additional aspects will be set forth in part in the description which follows and, in part, will be apparent from the description, or may be learned by practice example embodiments of the disclosure.

According to an aspect of an example embodiment, there is provided a direction estimating apparatus using an acoustic sensor, the direction estimating apparatus including a non-directional acoustic sensor, a plurality of directional acoustic sensors provided adjacent to the non-directional acoustic sensor, and a processor configured to obtain a first output signal from the non-directional acoustic sensor and a plurality of second output signals from the plurality of directional acoustic sensors, and estimate a direction of a sound source within an error range from −5 degrees to +5 degrees by comparing magnitudes between the two output signals and phase information between the first output signal and one of the second output signals.

The plurality of directional acoustic sensors may include three directional acoustic sensors provided in a triangular shape or radial shape with respect to the non-directional acoustic sensor.

The processor may be further configured to exclude a second output signal having a smallest magnitude from among the second output signals, and estimate the direction of the sound source based on phase information of an output signal obtained by adding the first output signal and the other second output signals.

The processor is further configured to select a second output signal having a greatest magnitude when the other second output signals are plural, and estimate the direction of the sound source based on phase information of the output signal obtained by adding the first output signal and the selected second output signal.

The processor may be further configured to compare whether phase information between the first output signal and one of the second output signals is greater than 0.

The direction of the sound source may be differently estimated based on a number of the plurality of directional acoustic sensors and arrangement of the plurality of directional acoustic sensors.

A directional shape of the second output signals may include a figure-of-8 shape regardless of a frequency of the sound source.

The processor may be further configured to obtain, when the plurality of directional acoustic sensors are three, the direction of the sound source according to $$\theta = \sum_{i=0}^{3} c_i \cdot r^i,$$

where Ci is an arbitrary coefficient, and ri is a power factor.

The processor may be further configured to compare, when there are two directional acoustic sensors, whether phase information of the output signal obtained by adding a second output signal having a greater magnitude among the two second output signals and the first output signal of the non-directional acoustic sensor is greater than 0.

The processor may be further configured to obtain the direction of the sound source according to $$\theta = \cos^{-1}\frac{P_1}{\sqrt{(P_1)^2 + (P_2)^2}},$$

where, P1 is greatest power, and P2 is smallest power.

The two directional acoustic sensors may be provided to be perpendicular to each other.

The processor may be further configured such that, when the plurality of directional acoustic sensors are four, each two directional acoustic sensors are provided to face each other.

The processor may be further configured to determine a directional acoustic sensor corresponding to a second output signal having a greatest magnitude among the plurality of second output signals, and compare a magnitude of the determined directional acoustic sensor with magnitudes of second output signals of two adjacent directional acoustic sensors provided on a left side and a right side.

The non-directional acoustic sensor and the plurality of directional acoustic sensors may be provided within a diameter of 3 cm.

According to another aspect of an example embodiment, there is provided an electronic device including a direction estimating apparatus using an acoustic sensor including a non-directional acoustic sensor, a plurality of directional acoustic sensors provided adjacent to the non-directional acoustic sensor, and a processor configured to obtain a first output signal from the non-directional acoustic sensor and a plurality of second output signals from the plurality of directional acoustic sensors, and estimate a direction of a sound source within an error range from −5 degrees to +5 degrees by comparing magnitudes between the two output signals and phase information between the first output signal and one of the second output signals.

According to another aspect of an example embodiment, there is provided a direction estimation method using an acoustic sensor, the direction estimation method including obtaining a first output signal from a non-directional acoustic sensor and a plurality of second output signals from a plurality of directional acoustic sensors, comparing magnitudes between the second output signals and phase information between the first output signal and one of the second output signals, and estimating a direction of a sound source within an error range of −5 degrees to +5 degrees.

The plurality of directional acoustic sensors may include three directional acoustic sensors provided in a triangular shape or radial shape with respect to the non-directional acoustic sensor.

The plurality of directional acoustic sensors may include two directional acoustic sensors provided perpendicular to each other or four directional acoustic sensors, each two of which are provided to face each other.

The direction of the sound source may be estimated based on phase information of an output signal obtained by adding the first output signal and the other second output signals by excluding a second output signal having a smallest magnitude from among the second output signals.

When the other second output signals are plural, a second output signal having a greatest magnitude is selected, and the direction of the sound source may be estimated based on phase information of the output signal obtained by adding the first output signal and the selected second output signal.

BRIEF DESCRIPTION OF THE DRAWINGS

The above and/or other aspects, features, and advantages of example embodiments of the disclosure will be more apparent from the following description taken in conjunction with the accompanying drawings, in which.

DETAILED DESCRIPTION

Figure 1:
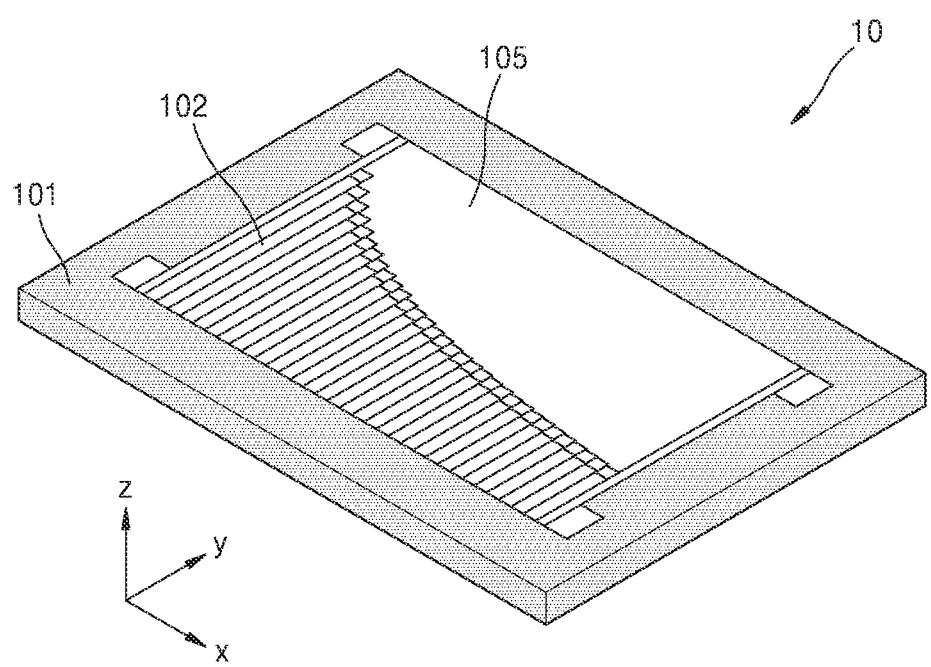
FIG. 1 illustrates an example of a directional acoustic sensor.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terms used in the example embodiments below are those general terms currently widely used in the art in consideration of functions in regard to the present embodiments, but the terms may vary according to the intention of those of ordinary skill in the art, precedents, or new technology in the art. Also, specified terms may be selected arbitrarily, and in this case, the detailed meaning thereof will be described in the detailed description of the relevant example embodiment. Thus, the terms used in the example embodiments should be understood not as simple names but based on the meaning of the terms and the overall description of the embodiments.

It will also be understood that when an element is referred to as being "on" or "above" another element, the element may be in direct contact with the other element or other intervening elements may be present. The singular forms include the plural forms unless the context clearly indicates otherwise.

In the description of the embodiments, when a portion "connects" or is "connected" to another portion, the portion contacts or is connected to the other portion not only directly but also electrically through at least one of other portions interposed therebetween.

Herein, the terms such as "comprise" or "include" should not be construed as necessarily including various elements or processes described in the specification, and it should be construed that some of the elements or the processes may not be included, or additional elements or processes may be further included.

In the present description, terms including ordinal numbers such as "first", "second", etc. are used to describe various elements but the elements should not be defined by these terms. The terms are used only for distinguishing one element from another element.

In the example embodiments, an acoustic sensor may be a microphone, and refer to an apparatus receiving a sound wave, which is a wave in air, and converting the same to an electrical signal.

In the example embodiments, an acoustic sensor assembly is used to refer to an acoustic sensor or a microphone and a processor for controlling the acoustic sensor or the microphone, and calculating necessary functions. In addition, the acoustic sensor assembly may refer to an apparatus configured to estimate a direction by using the acoustic sensor according to an example embodiment.

The example embodiments relate to an acoustic sensor assembly, and detailed descriptions of matters widely known to those of ordinary skill in the art to which the following example embodiments belong are omitted.

Description of the following example embodiments should not be construed as limiting or defining the scope of the present disclosure, and details that are easily derivable by one of ordinary skill in the art to which the present disclosure pertains are construed as being in the scope of the embodiments. Hereinafter, example embodiments that are just for illustration are described in detail with reference to the attached drawings.

Figure 2:
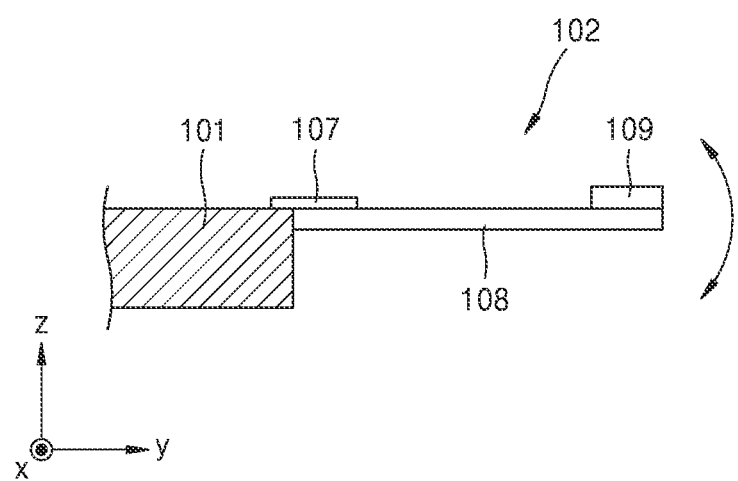
FIG. 2 is a cross-sectional view of a resonator illustrated in FIG. 1.

FIG. 1 illustrates an example of a directional acoustic sensor 10. FIG. 2 is a cross-sectional view of a resonator 102 illustrated in FIG. 1.

Referring to FIGS. 1 and 2, the directional acoustic sensor 10 may include a support 101 and a plurality of resonators 102. A cavity 105 may be formed in the support 101 to pass through the support 101. As the support 101, for example, a silicon substrate, may be used, but is not limited thereto.

The plurality of resonators 102 may be arranged in the cavity 105 of the support 101 in a certain form. The resonators 102 may be arranged two-dimensionally without overlapping each other. As illustrated in FIG. 2, an end of each of the resonators 102 may be fixed to the support 101, and the other end thereof may extend toward the cavity 105. Each of the resonators 102 may include a driving unit 108 moving by reacting to input sound and a sensing unit 107 sensing a movement of the driving unit 108. The resonators 102 may also include a mass body 109, for providing a certain mass to the driving unit 108, that is provided, for example, at one end of the resonator opposite to the support 101.

The resonators 102 may be provided to sense, for example, acoustic frequencies of different bands. For example, the resonators 102 may be provided to have different center frequencies or resonance frequencies. To this end, the resonators 102 may be provided to have different dimensions from each other. For example, the resonators 102 may be provided to have different lengths, widths or thicknesses from each other.

Dimensions, such as widths or thicknesses of the resonators 102, may be set by considering a desired resonance frequency with respect to the resonators 102. For example, the resonators 102 may have dimensions, such as a width from about several μm to several hundreds of μm, a thickness of several μm or less, and a length of about several mm or less. The resonators 102 having fine sizes may be manufactured by a micro electro mechanical system (MEMS) process.

Figure 3:
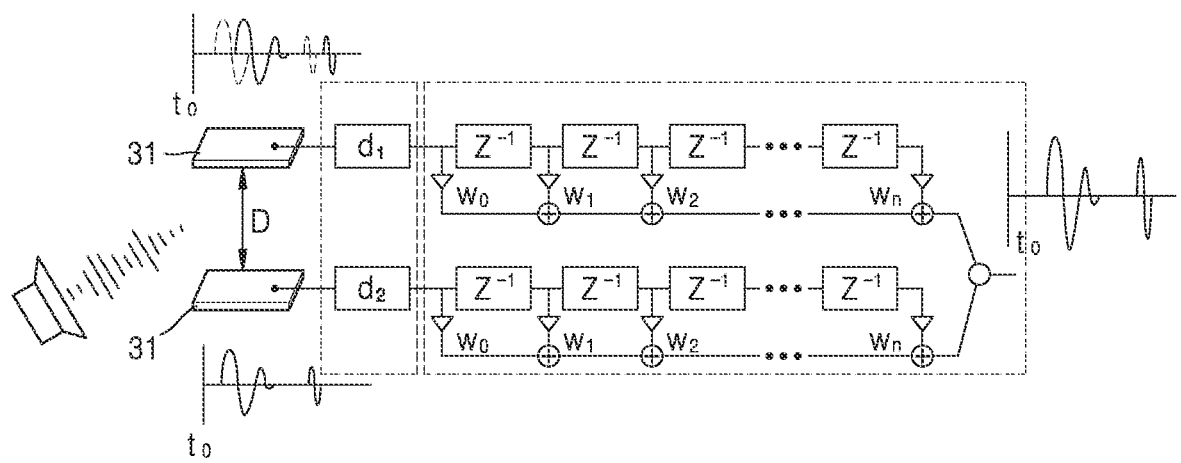
FIG. 3 is a diagram illustrating a method of adjusting directivity by using a plurality of acoustic sensors according to a related example.

FIG. 3 is a diagram illustrating a method of adjusting directivity by using a plurality of acoustic sensors, according to a related example. Referring to FIG. 3, in a method of adjusting directivity by using a plurality of acoustic sensors 31, the plurality of acoustic sensors 31 may be used to hear sound in a particular direction louder than sound in other directions. The plurality of acoustic sensors 31 may be arranged spaced apart at a certain distance D, a time or phase delay that sound reaches each acoustic sensor 31 is caused due to the distance D, and the overall directivity may be adjusted by varying the degrees of compensation for the time delay or phase delay. The above method of adjusting directivity may be referred to as time difference of arrival (TDOA). However, the above method is based on the assumption that there is a difference in times that sound reaches each acoustic sensor. Therefore, there may be a restriction in setting a distance between acoustic sensors as the distance needs to be set by considering a wavelength of an audible frequency band. The restriction in setting a distance between acoustic sensors may also limit providing a compact size of a device performing the above method. In particular, as a low frequency has a longer wavelength, to distinguish a sound of a low frequency, a distance between acoustic sensors needs to be relatively broad and a signal-to-noise ratio (SNR) of each acoustic sensor needs to be relatively high.

Moreover, as phases differ according to frequency bands of sound sensed by each acoustic sensor in the TDOA, the phases may have to be compensated for with respect to each frequency band. In order to compensate for the phase of each frequency, a complex signal processing process of applying an appropriate weight to each frequency may be necessary in the method described above.

In addition, to estimate a direction of a sound source by using TDOA, a signal in an array of a plurality of non-directional microphones is frequently used. A time delay between signals obtained by each microphone may be calculated, and a direction from which a sound source came is estimated based on the time delay. However, the accuracy of the direction estimation is dependent on the size of the array (distance between the microphones) and the time delay.

Another method is to estimate a direction of a sound source based on the intensity difference. This method uses a difference between intensities or levels measured by each microphone to estimate a direction. From which direction a sound source came is determined based on the magnitude of a signal measured in a time domain. As a size difference between each microphone is used, gain calibration is to be done very accurately, and a large number of microphones are required to improve performance.

When using the TDOA-based direction estimation method, the principle of generating a difference in phases between the microphones for each frequency of a sound source according to the size of the microphone array is utilized. Therefore, the size of the array and a wavelength of a sound source to be estimated have a physical relationship, and the size of the array determines the direction estimation performance.

A method of utilizing a time difference or intensity difference between microphones, according to related art, requires a large number of microphones by increasing a size of the array in order to improve the direction estimation performance. In addition, in the time difference-based estimation method, a digital signal processing device is required to calculate different time delays and phase differences for each frequency, and the performance of the device is a factor limiting the direction estimation performance.

A direction estimating apparatus using an acoustic sensor, according to an example embodiment, provides a direction estimation algorithm using a directional/non-directional microphone array. By using a channel module including one non-directional microphone and two or more directional microphones, a direction of a sound source coming from 360 degrees omni-directionally is detected. In an example embodiment, by utilizing the fact that a directional shape of a directional microphone is figure-of-8, regardless of frequency, a direction of a sound source is estimated based on power of the sound source. Therefore, the direction of the sound source may be estimated by using an array having a small size, for example, an array within 3 cm, and with high accuracy, and voice separation based on spatial information may also be performed.

Hereinafter, an efficient structure and operation of a direction estimating apparatus according to the present disclosure are described in detail with reference to the drawings.

Figure 4:
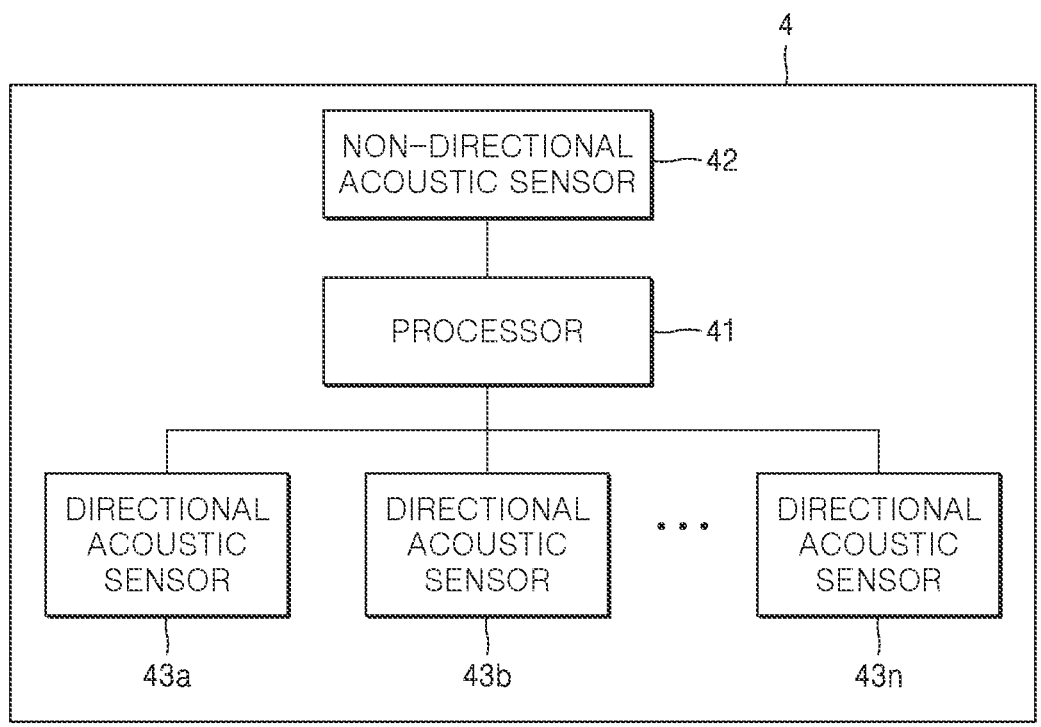
FIG. 4 is a block diagram of a direction estimating apparatus according to an example embodiment.

FIG. 4 is a block diagram of a direction estimating apparatus including an acoustic sensor, according to an example embodiment. Referring to FIG. 4, a direction estimating apparatus 4 may include a processor 41, a non-directional acoustic sensor 42, and a plurality of directional acoustic sensors 43a, 43b, ..., 43n. The direction estimating apparatus 4 may obtain sound around the direction estimating apparatus 4 by using the processor 41, the non-directional acoustic sensor 42, and the plurality of directional acoustic sensors 43a, 43b, ..., 43n.

The non-directional acoustic sensor 42 may sense sound in all directions surrounding the non-directional acoustic sensor 42. The non-directional acoustic sensor 42 may have directivity for uniformly sensing sound in all directions. For example, the directivity for uniformly sensing sound in all directions may be omni-directional or non-directional.

The sound sensed using the non-directional acoustic sensor 42 may be output as a same output signal from the non-directional acoustic sensor 42, regardless of a direction in which the sound is input. Accordingly, a sound source reproduced based on the output signal of the non-directional acoustic sensor 42 may not include information on directions.

A directivity of an acoustic sensor may be expressed using a directional pattern, and the directional pattern may refer to a pattern indicating a direction in which an acoustic sensor may receive a sound source.

A directional pattern may be illustrated to identify sensitivity of an acoustic sensor according to a direction in which sound is transmitted based on a 360° space surrounding the acoustic sensor having the directional pattern. For example, a directional pattern of the non-directional acoustic sensor 42 may be illustrated in a circle to indicate that the non-directional acoustic sensor 42 has the same sensitivity to sounds transmitted 360° non-directionally. A specific application of the directional pattern of the non-directional acoustic sensor 42 will be described later with reference to FIGS. 8A and 8B.

Each of the plurality of directional acoustic sensors 43a, 43b, ..., 43n may have a same configuration as the directional acoustic sensor 10 illustrated in FIG. 1 described above. The plurality of directional acoustic sensors 43a, 43b, ..., 43n may sense sound from a front side (e.g., +z direction in FIG. 1) and a rear side (e.g., −z direction of FIG. 1). Each of the plurality of directional acoustic sensors 43a, 43b, ..., 43n may have directivity of sensing sounds from the front side and the rear side. For example, directivity for sensing sounds from a front side direction and a rear side direction may be bi-directional.

The plurality of directional acoustic sensors 43a, 43b, ..., 43n may be arranged adjacent to and to surround the non-directional acoustic sensor 42. The number and arrangement of the plurality of directional acoustic sensors 43a, 43b, ..., 43n will be described later in detail with reference to FIGS. 10A to 10D.

The processor 41 controls the overall operation of the direction estimating apparatus 4 and performs signal processing. The processor 41 may select at least one of output signals of acoustic sensors having different directivities, thereby calculating an acoustic signal having a same directivity as those of the non-directional acoustic sensor 42 and the plurality of directional acoustic sensors 43a, 43b, ..., 43n. An acoustic signal having a directional pattern of an acoustic sensor corresponding to an output signal selected by the processor 41 may be calculated based on the output signal selected by the processor 41. For example, the selected output signal may be identical to the acoustic signal. The processor 41 may adjust directivity by selecting a directional pattern of the direction estimating apparatus 4 as a directional pattern of an acoustic sensor corresponding to the selected output signal, and may reduce or loudly sense sound transmitted in a certain direction according to situations.

An acoustic signal refers to a signal including information about directivity, like output signals of the non-directional acoustic sensor 42 and the plurality of directional acoustic sensors 43a, 43b, ..., 43n, and some of the output signals may be selected and determined as acoustic signals or may be newly calculated based on calculation of some of the output signals. A directional pattern of an acoustic signal may be in a same shape as directional patterns of the non-directional acoustic sensor 42 and the plurality of directional acoustic sensors 43a, 43b, ..., 43n or in a different shape, and have a same or different directivity. For example, there may be no limitation on a directional pattern or directivity of an acoustic signal.

The processor 41 may obtain output signals of the non-directional acoustic sensor 42 and/or the plurality of directional acoustic sensors 43a, 43b, ..., 43n, and may calculate an acoustic signal having a different directivity from those of the non-directional acoustic sensor 42 and the plurality of directional acoustic sensors 43a, 43b, ..., 43n included in the direction estimating apparatus 4 by selectively combining the obtained output signals. For example, the processor 41 may calculate an acoustic signal having a different directional pattern from directional patterns of the non-directional acoustic sensor 42 and the plurality of directional acoustic sensors 43a, 43b, ..., 43n. The processor 41 may calculate an acoustic signal having a directional pattern oriented toward a front of a directional acoustic sensor (e.g., 43a), depending on the situation.

The processor 41 may calculate an acoustic signal by calculating at least one of a sum of and a difference between certain ratios of an output signal of the non-directional acoustic sensor 42 and output signals of the plurality of directional acoustic sensors 43a, 43b, ..., 43n.

The processor 41 may obtain sound around the direction estimating apparatus 4 by using an acoustic signal. The processor 41 may obtain ambient sound by distinguishing a direction of a sound transmitted to the direction estimating apparatus 4 by using an acoustic signal. For example, when the processor 41 records a sound source transmitted from the right side of the direction estimating apparatus 4 and provides the recorded sound source to a user, the user may hear the sound source as if the sound source is coming from the right side of the user. When the processor 41 records a sound source circling the direction estimating apparatus 4 and provides the recorded sound source to the user, the user may hear the sound source as if the sound source is circling the user.

The processor 41 may obtain a first output signal from the non-directional acoustic sensor 42 and a plurality of second output signals from the plurality of directional acoustic sensors 43a, 43b, . . . 43n, and estimate a direction of a sound source within an error range from −5 degrees to +5 degrees by comparing magnitudes between the second output signals and phase information between the first output signal and one of the second output signals.

The processor 41 may exclude a second output signal having the smallest magnitude among the second output signals. The processor 41 may sum up the first output signal and the remaining second output signals other than the second output signal having the smallest magnitude, and estimate a direction of a sound source by using phase information of the summed output signals. Here, when the remaining second output signals are plural, the processor 41 may select a second output signal having a greatest magnitude. In addition, the processor 41 may estimate a direction of a sound source by using phase information of an output signal obtained by summing up and adding the first output signal and the second output signal having a greatest magnitude.

The processor 41 may estimate a direction of a sound source by using various algorithms according to the number and arrangement of directional acoustic sensors. The method is in further detail later with reference to FIGS. 13 and 15.

The processor 41 may include a single processor core (single-core) or a plurality of processor cores (multi-core). The processor 41 may process or execute programs and/or data stored in a memory. In some example embodiments, the processor 41 may control a function of the direction estimating apparatus 4 by executing programs stored in a memory. The processor 41 may be implemented as a central processing unit (CPU), a graphics processing unit (GPU), an application processor (AP), or the like.

Figure 5:
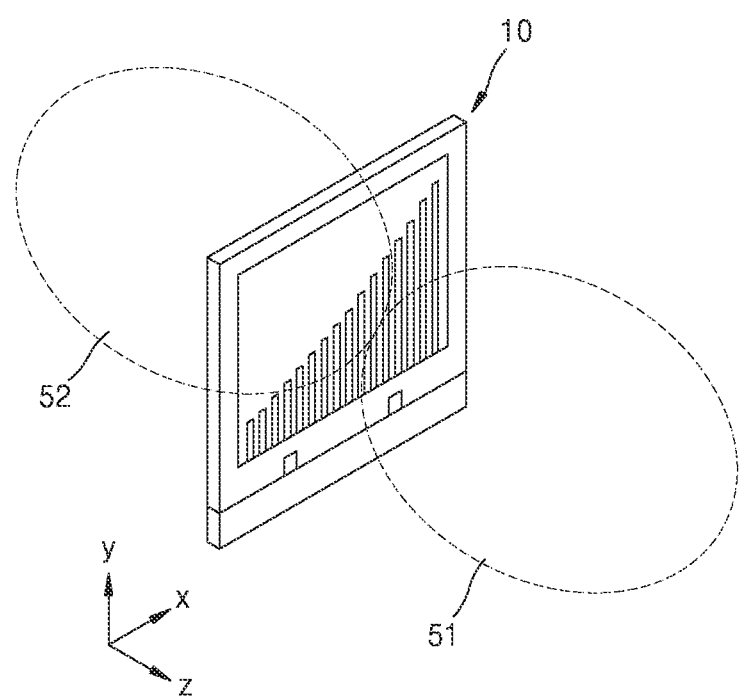
FIG. 5 is a diagram illustrating a directional acoustic sensor according to an embodiment and a directional pattern of the directional acoustic sensor.

FIG. 5 is a diagram illustrating a directional acoustic sensor according to an example embodiment and a directional pattern of the directional acoustic sensor. Referring to FIG. 5, a directional acoustic sensor 10 may include bi-directional patterns 51 and 52. For example, the bi-directional patterns 51 and 52 may include figure-8 type directional patterns including a front side portion 51 oriented toward a front side of the directional acoustic sensor 10 (+z direction) and a rear side portion 52 oriented toward a rear side of the directional acoustic sensor 10 (−z direction).

Figure 6:
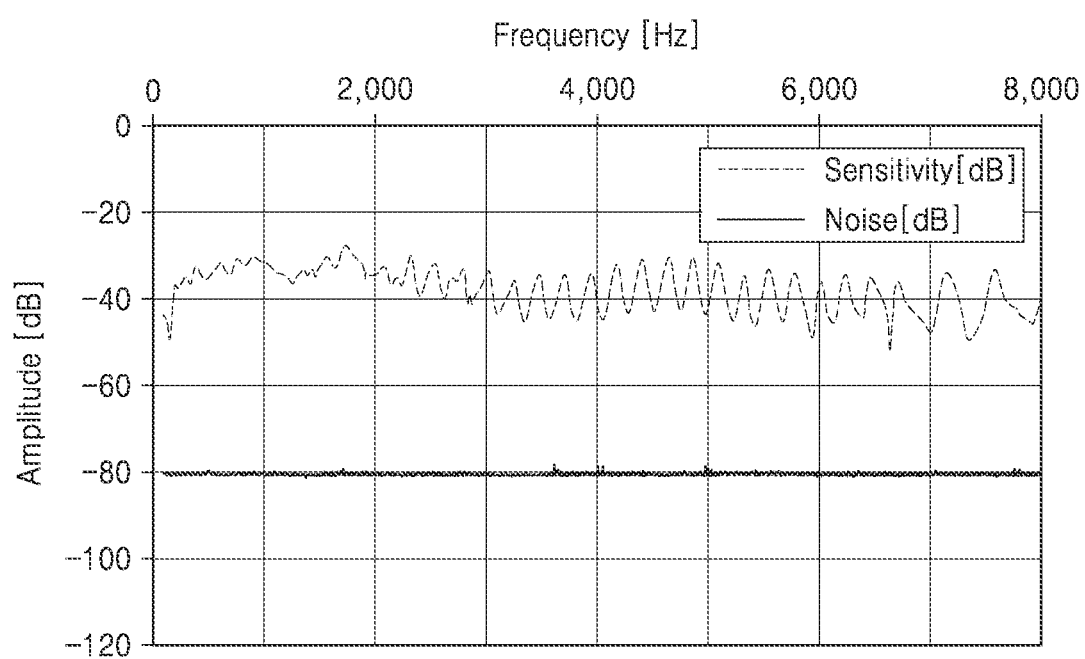
FIG. 6 is a diagram illustrating results of measurement of frequency response characteristics of the directional acoustic sensor.

FIG. 6 is a diagram illustrating results of measurement of frequency response characteristics of the directional acoustic sensor 10. Referring to FIG. 6, the directional acoustic sensor 10 has uniform sensitivity with respect to various frequencies. In a frequency range from 0 Hz to 8000 Hz, sensitivity marked by a dashed line is uniformly at −40 dB, and noise marked by a solid line is at −80 dB. The directional acoustic sensor 10 has uniform sensitivity with respect to various frequencies, and may thus uniformly sense sounds of the various frequencies.

Figure 7:
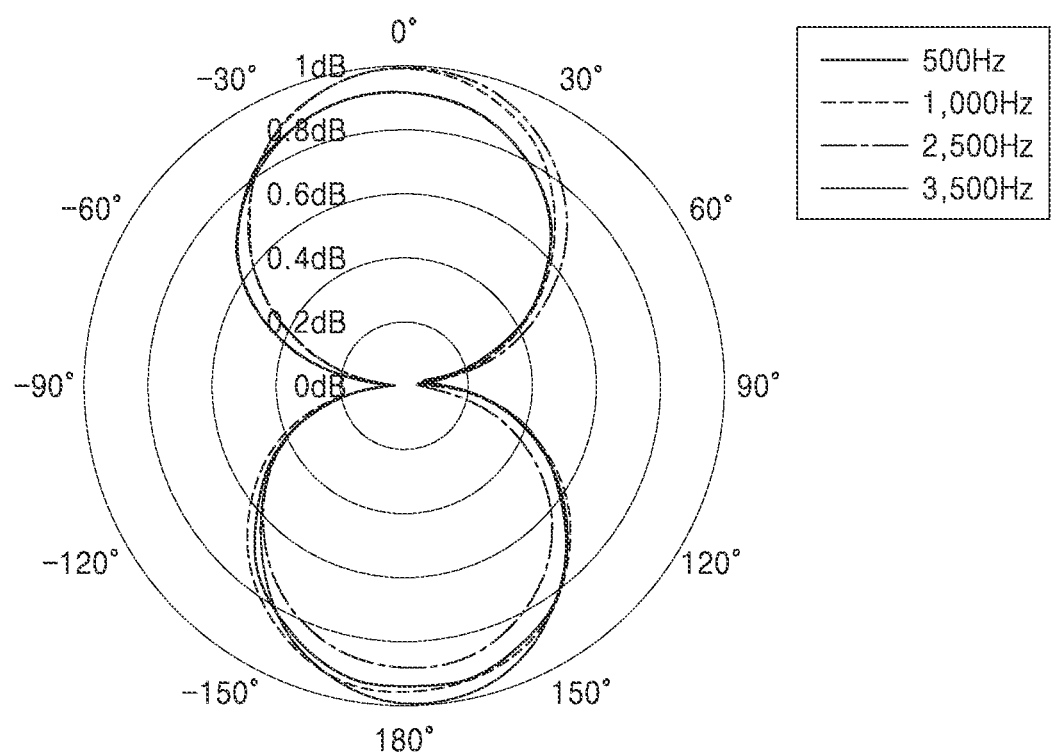
FIG. 7 is a diagram illustrating results of measurement of a directional pattern of the directional acoustic sensor.

FIG. 7 is a diagram illustrating results of measurement of a directional pattern of the directional acoustic sensor 10. As illustrated in FIG. 7, the directional acoustic sensor 10 has a uniform, bi-directional pattern with respect to various frequencies. For example, the directional acoustic sensor 10 has directivity in a +z axis direction and a −z axis direction of FIG. 1, which are a 0-degree direction and a 180-degree direction, respectively.

Figure 8A:
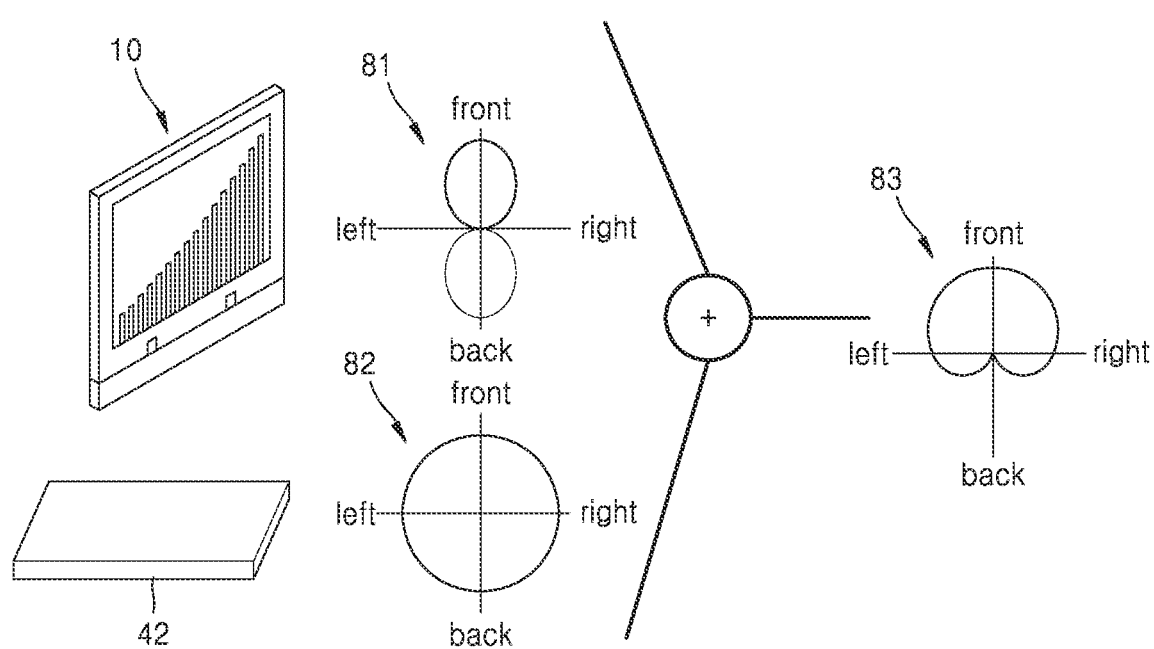
FIGS. 8A and 8B are diagrams illustrating signal processing of an acoustic sensor according to an example embodiment.

FIG. 8A is a diagram illustrating signal processing of a direction estimating apparatus according to an example embodiment. Referring to FIG. 8A, the processor 41 may calculate an acoustic signal by calculating at least one of a sum of and a difference between certain ratios of an output signal of the non-directional acoustic sensor 42 and an output signal of the directional acoustic sensor 10. An acoustic signal may include a digital signal calculated based on output signals so that the acoustic signal has a different shape or a different directivity from those of direction patterns (a bi-directional pattern 81 and an omni-directional pattern 82) of the directional acoustic sensor 10 and the non-directional acoustic sensor 42. For example, in a calculation to calculate an acoustic signal, when an output signal of the non-directional acoustic sensor 42 is G1, an output signal of the directional acoustic sensor 10 is G2, and a ratio of the output signal G2 of the directional acoustic sensor 10 to the acoustic signal G1 of the non-directional acoustic sensor 42 is 1:k, a sum of certain ratios between the output signals G1 and G2 may be calculated using a formula of G1+kG2, and a difference between the certain ratios of the output signals G1 and G2 may be calculated using a formula of G1−kG2. A ratio of each of the output signals may be preset according to a shape or directivity of a required, appropriate directional pattern.

The processor 41 may calculate an acoustic signal having a directional pattern oriented toward the front side direction of the directional acoustic sensor 10 (e.g., +z direction of FIG. 5) by calculating a sum of certain ratios of an output signal of the non-directional acoustic sensor 42 and an output signal of the directional acoustic sensor 10.

The non-directional acoustic sensor 42 is oriented in all directions, and thus, there may be no difference in output signals regardless of a direction in which sound is transmitted. However, for convenience of description below, the front side direction of the directional acoustic sensor 10 will be assumed to be identical to a front side direction of the non-directional acoustic sensor 42.

For example, the processor 41 may calculate an acoustic signal having a uni-directional pattern 83 by calculating a sum of 1:1 ratios of an output signal of the non-directional acoustic sensor 42 and an output signal of the directional acoustic sensor 10. The uni-directional pattern 83 may have a directivity facing the front of the directional acoustic sensor 10. However, the uni-directional pattern 83 may include a directional pattern covering a broader range to the left and the right, compared to a front portion of the bi-directional pattern 81. For example, the uni-directional pattern 83 may include a cardioid directional pattern.

The directional acoustic sensor 10 may include the bi-directional pattern 81, and the non-directional acoustic sensor 42 may include the omni-directional pattern 82. The directional acoustic sensor 10 may sense a sound that is in-phase with a phase of a sound sensed by the non-directional acoustic sensor 42 from a front side direction of the bi-directional pattern 81 (e.g., +z direction of FIG. 5), and a sound that is anti-phase with a phase of a sound sensed by the non-directional acoustic sensor 42 from a rear side direction of the bi-directional pattern 81 (e.g., −z direction of FIG. 5).

Figure 9A:
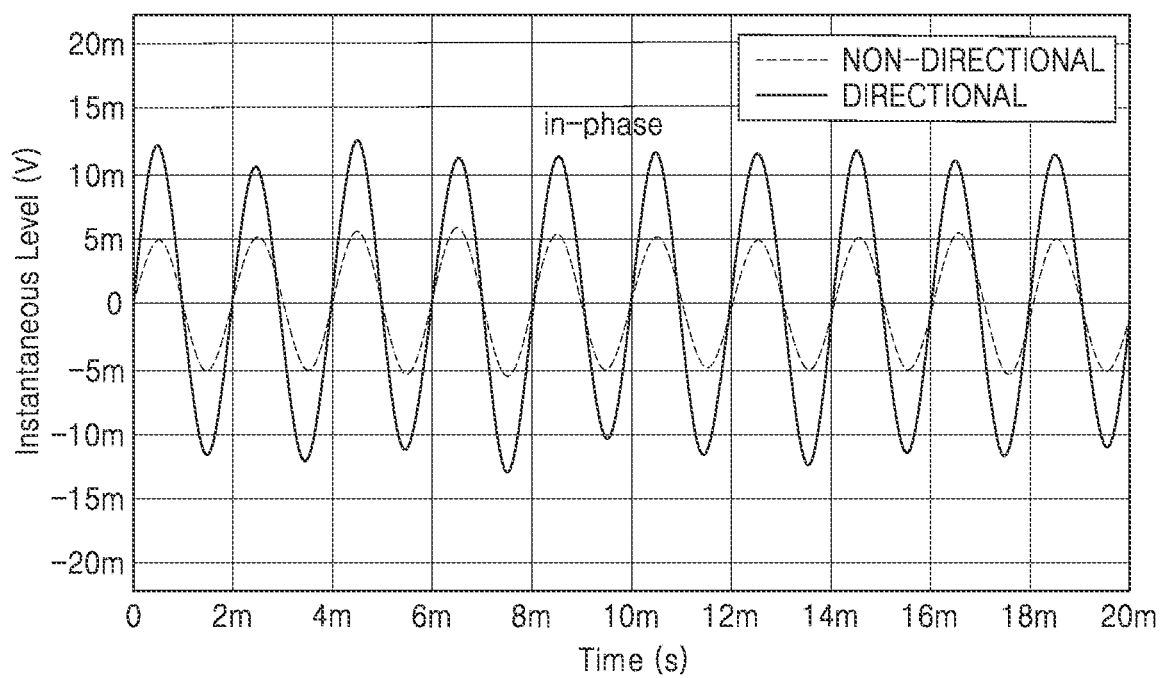
FIGS. 9A and 9B are graphs showing a result of sensing, by acoustic sensors, sound transmitted from a front direction, and sound transmitted from a rear side direction, according to an example embodiment.
Figure 9B:
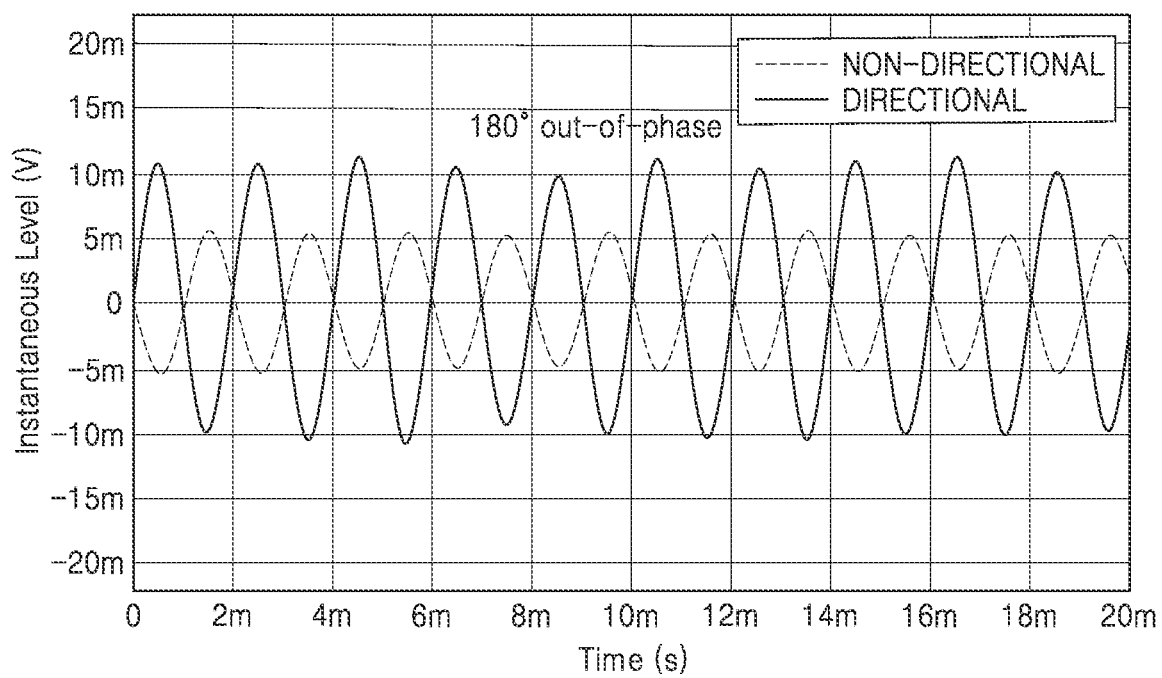

FIG. 9A is a graph showing a result of sensing sound transmitted from a front direction, by acoustic sensors, according to an example embodiment. FIG. 9B is a graph showing a result of sensing sound transmitted from a rear side direction, by acoustic sensors, according to an example embodiment.

Referring to FIGS. 9A and 9B, a sound transmitted from the front side direction of the directional acoustic sensor 10 and sound transmitted from the front side direction of the non-directional acoustic sensor 42 are in-phase with each other, and the sound transmitted from the front direction of the directional acoustic sensor 10 and sound transmitted from the rear side direction of the non-directional acoustic sensor 42 have a phase difference of 180° from each other such that peaks and troughs alternately cross each other.

Referring back to FIG. 8A, sounds transmitted from the front side direction are in-phase with each other, and sounds transmitted from the rear side direction are in anti-phase with each other, and thus, some of the output signals are added and some others are offset and an acoustic signal having the uni-directional pattern 83 oriented in the front direction may be calculated, accordingly.

Figure 8B:
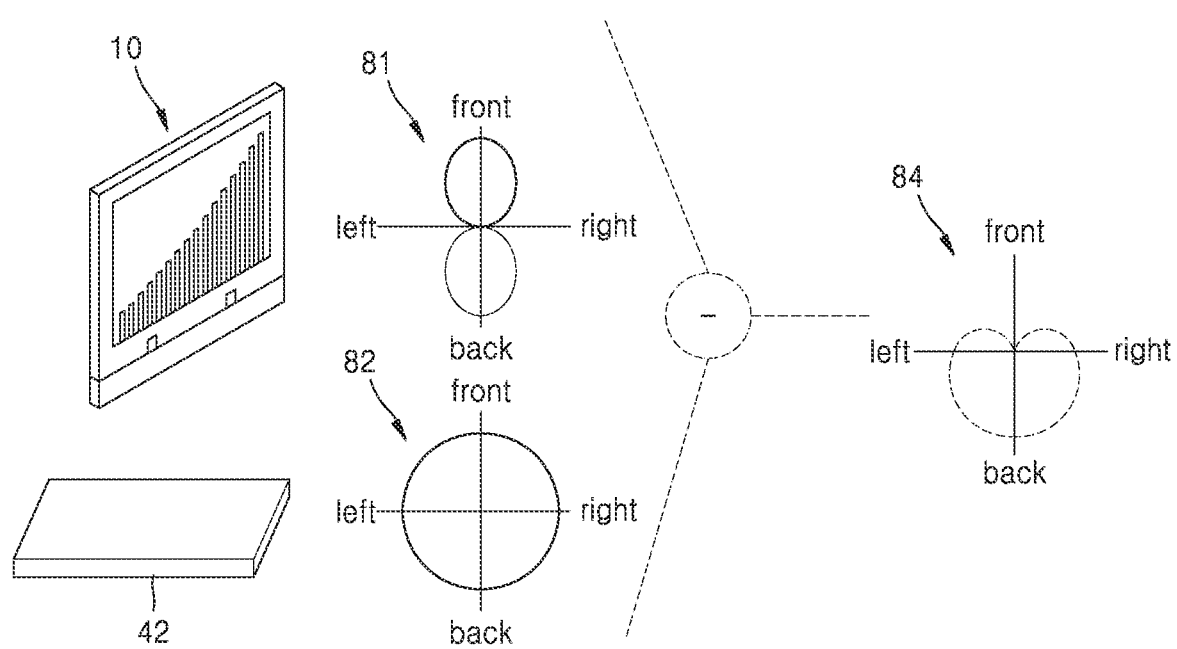

FIG. 8B is a diagram illustrating signal processing of a direction estimating apparatus according to an example embodiment. Referring to FIG. 8B, the processor 41 may calculate an acoustic signal having a directional pattern oriented toward the rear side direction of the directional acoustic sensor 10 (e.g., −z direction of FIG. 5) by calculating a difference between certain ratios of an output signal of the non-directional acoustic sensor 42 and an output signal of the directional acoustic sensor 10.

For example, the processor 41 may calculate an acoustic signal having a uni-directional pattern 84 by calculating a difference between 1:1 ratios of an output signal of the non-directional acoustic sensor 42 and an output signal of the directional acoustic sensor 10. Opposite to the uni-directional pattern 83 of FIG. 8A, the uni-directional pattern 84 may have a directivity facing a rear surface of the directional acoustic sensor 10. The uni-directional pattern 84 may include a directional pattern covering a broader range to the left and the right, compared to a rear side portion of the bi-directional pattern 81. For example, the uni-directional pattern 83 may include a cardioid directional pattern.

While a method of calculating an acoustic signal having a uni-directional pattern by calculating a sum of or a difference between an output of the directional acoustic sensor 10 and an output of the non-directional acoustic sensor 42 is described above, this is merely an example, and the control of directivity is not limited to the method described above.

The processor 41 may calculate an acoustic signal having a new bi-directional pattern differing from bi-directivity of respective directional acoustic sensors by selecting only a non-directional pattern, or selecting only a bi-directional pattern of a directional acoustic sensor oriented toward a certain direction, or calculating output signals of directional acoustic sensors, according to situations.

FIGS. 10A to 10D are diagrams illustrating examples of the number and arrangement of a non-directional acoustic sensor and a plurality of directional acoustic sensors, according to an example embodiment.

Figure 10A:
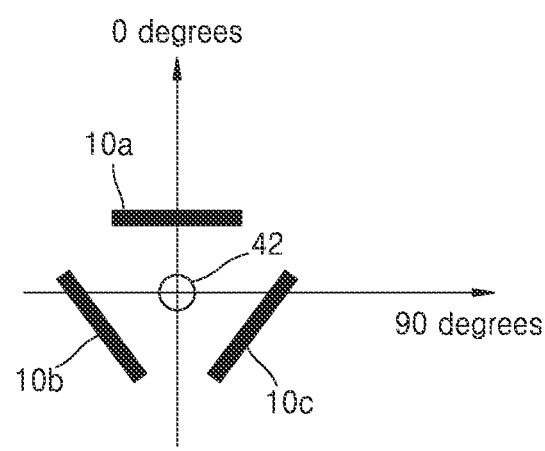
FIGS. 10A, 10B, 10C, and 10D are diagrams illustrating examples of the number and arrangement of a non-directional acoustic sensor and a plurality of directional acoustic sensors, according to an example embodiment.

Referring to FIG. 10A, in an example, the non-directional acoustic sensor 42 is arranged in a center, and three directional acoustic sensors 10a, 10b, and 10c are arranged at a distance of 120 degrees. The above shape may be a triangular arrangement, and the overall size may be within 3 cm.

Figure 10B:
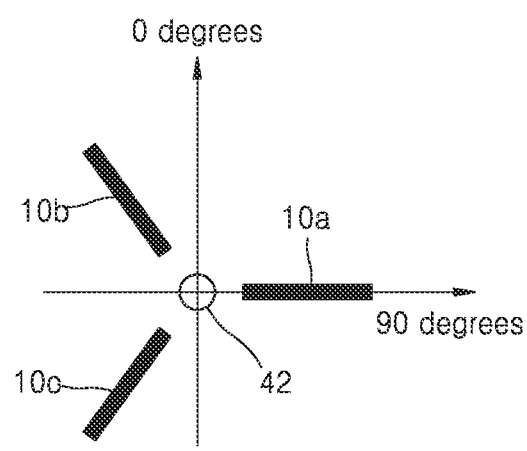

Referring to FIG. 10B, in another example, the non-directional acoustic sensor 42 may be arranged in a center, and the three directional acoustic sensors 10a, 10b, and 10c may be arranged at a distance of 120 degrees, and the above form may be in a radial arrangement. Like FIG. 10A, the overall size may be within 3 cm.

Here, the directional acoustic sensors have a directional pattern in the form of a figure-of-8. The directional pattern has a cosine function value according to an angle. Therefore, outside a +/−60 degree range, power detected by the directional acoustic sensors is reduced to half or more than half. Therefore, considering the above-described reason and the cost incurred by the increase in the number of sensors, using three directional acoustic sensors may be more efficient.

Figure 11:
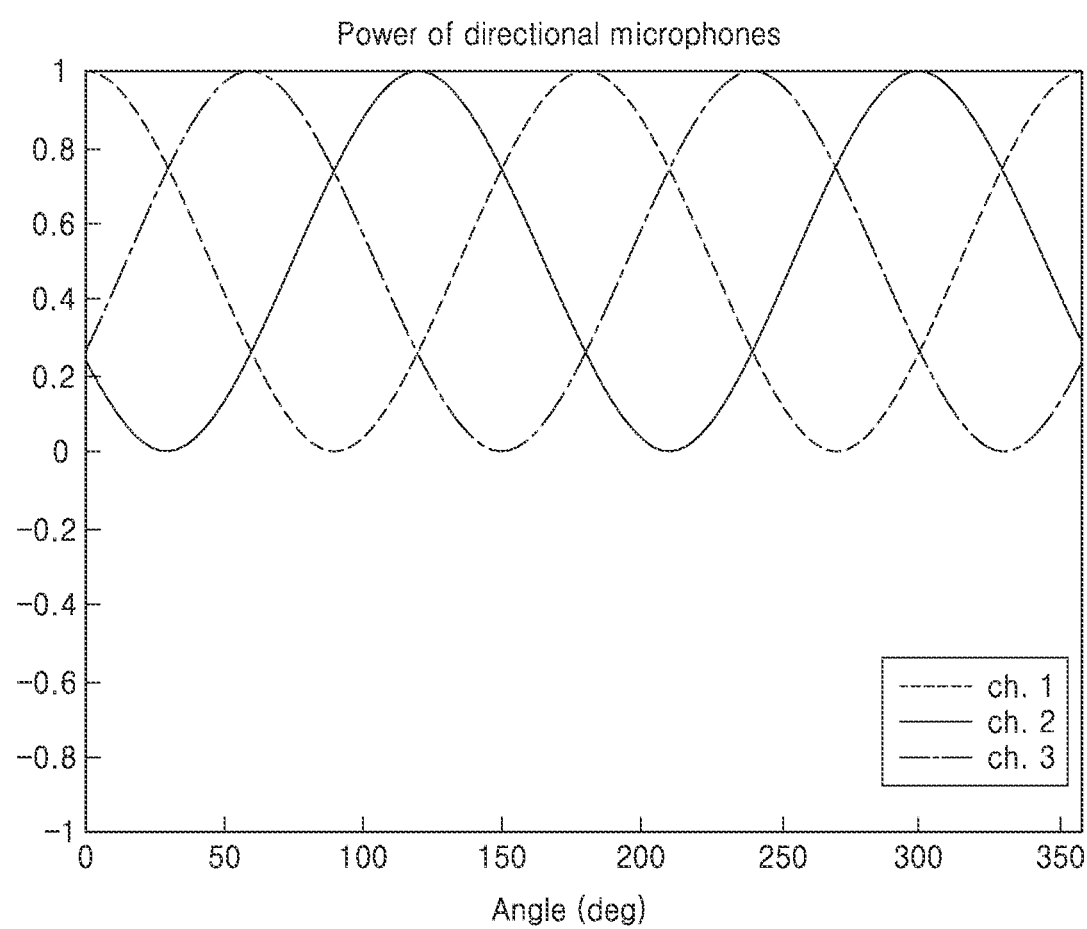
FIGS. 11 and 12 are diagrams illustrating power of each directional acoustic sensor according to an angle and ratios between powers of respective directional acoustic sensors, in the arrangement illustrated in FIG. 10A.
Figure 12:
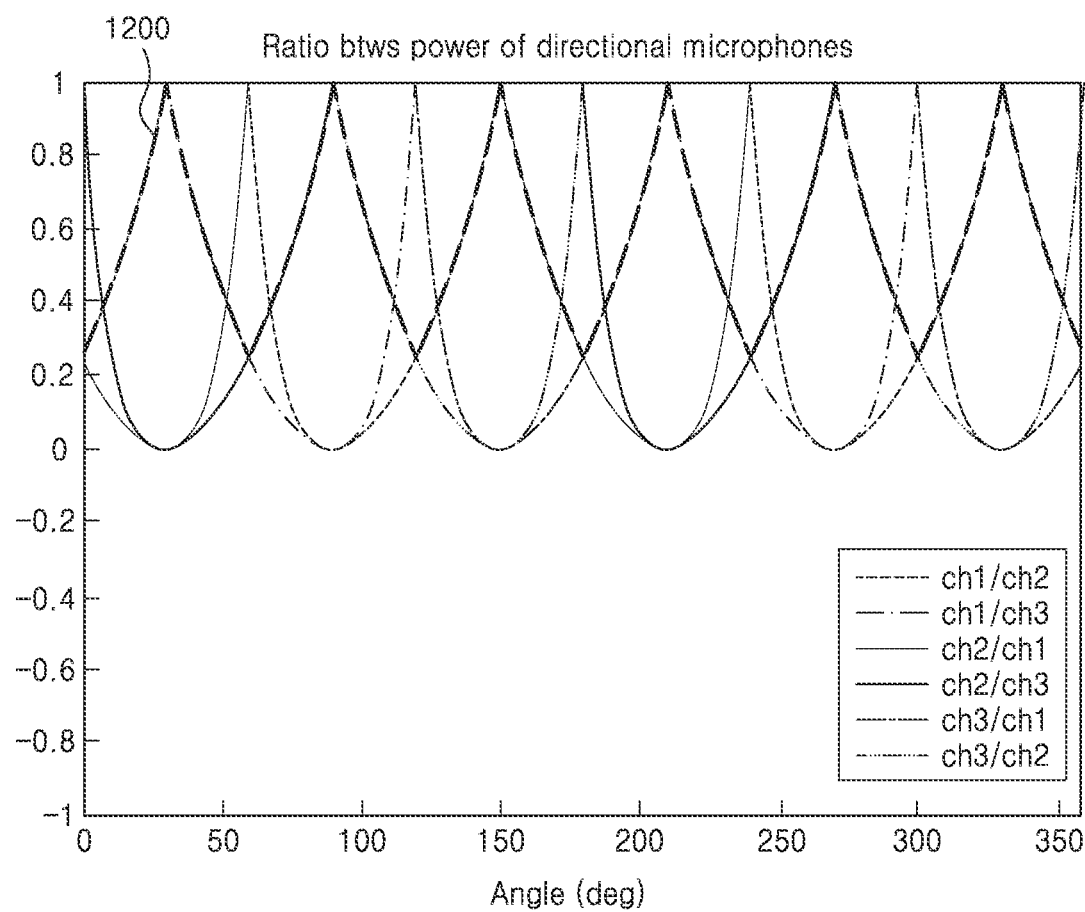

According to an example embodiment, directional acoustic sensors may be arranged in a triangular shape illustrated in FIG. 10A or a radial shape illustrated in FIG. 10B. When the directional acoustic sensors 10a, 10b, and 10c illustrated in FIGS. 10A and 10B are referred to as channel 1 (ch. 1), channel 2 (ch. 2), and channel 3 (ch. 3), respectively, ideal power of each channel according to an angle is as illustrated in FIG. 11. In addition, ratios between the powers of the channels according to an angle are obtained as illustrated in FIG. 12. Here, a ratio between two largest channels among the three channels is illustrated by a dashed line 1200. In an example embodiment, a power ratio of two channels may be used for direction estimation except for a channel having lowest power from among the three channels.

Figure 13:
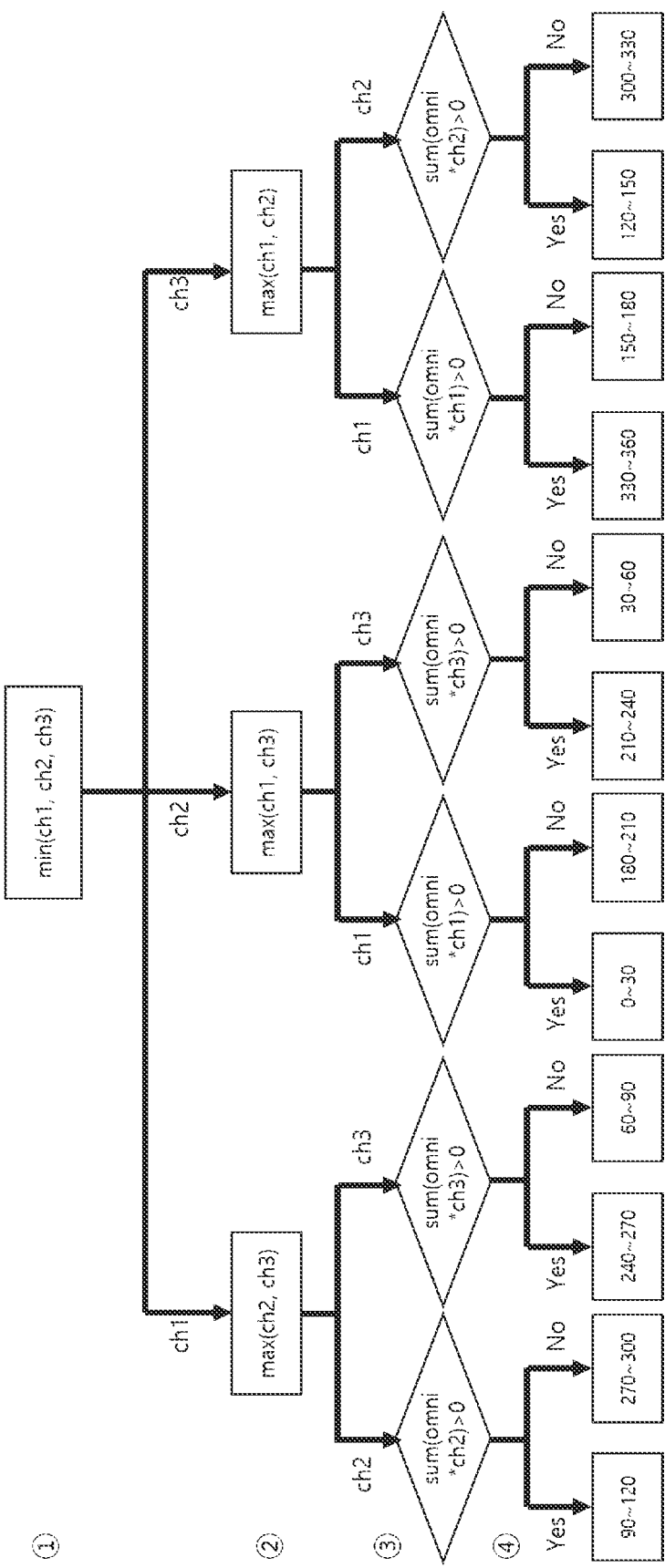
FIGS. 13, 14, and 15 are flowcharts illustrating distinguishing of an angle in a direction estimation algorithm according to various example embodiments.

Referring to FIG. 13, as illustrated in FIGS. 10A and 10B, a direction estimation algorithm for a 4-channel acoustic sensor arrangement is described.

First, a channel having a minimum output among the channels of the three directional acoustic sensors is determined. Next, a channel having a smallest output from among the remaining two channels is determined. Then, a phase between the directional acoustic sensor and the non-directional acoustic sensor is checked.

When the power or magnitude of channel 1 (ch. 1) among the three channels is the smallest, the larger channel among the remaining two channels, that is, channel 2 and channel 3, is determined.

When channel 2 (ch. 2) is larger, it is determined whether a phase of an output signal obtained by summing up and adding an output signal of channel 2 (ch. 2) and an output signal of the non-directional acoustic sensor 42 is greater than 0. When the phase of the obtained output signal is greater than 0, a direction of the sound source may be estimated to be between 90 degrees and 120 degrees, and otherwise, the direction of the sound source may be estimated to be between 270 degrees and 300 degrees, which is inverted by 180 degrees.

Conversely, when channel 3 (ch. 3) is larger, it is determined whether a phase of an output signal obtained by adding an output signal of the channel 3 (ch. 3) and an output signal of the non-directional acoustic sensor 42 is greater than 0. When the phase of the obtained output signal is greater than 0, a direction of the sound source may be estimated to be between 240 degrees and 270 degrees, and otherwise, the direction of the sound source may be estimated to be between 60 degrees and 90 degrees, which is inverted by 180 degrees.

Similarly, when the power or magnitude of channel 2 (ch.2) among the three channels is the smallest or when the power or magnitude of channel 3 (ch.3) is the smallest among the three channels, a direction of a sound source may be estimated in a similar manner to the method described above.

After a domain for an angle range is determined using the above method, a direction or angle of the sound source may be calculated according to Equation 1 below.

$$\theta = \sum_{i=0}^{3} c_i \cdot r_i^i \, (c_1 = \text{coefficient}, r_i = \text{power ratio}) \quad \text{[Equation 1]}$$

In an example embodiment, in direction estimation using a 4-channel acoustic sensor array (one non-directional acoustic sensor and three directional acoustic sensors), by excluding a channel having a smallest power for each angle, from angle calculation when estimating a direction, an error due to a reflected wave due to a reduction in size rejection of a directional microphone in a general noise environment may be minimized.

Figure 16:
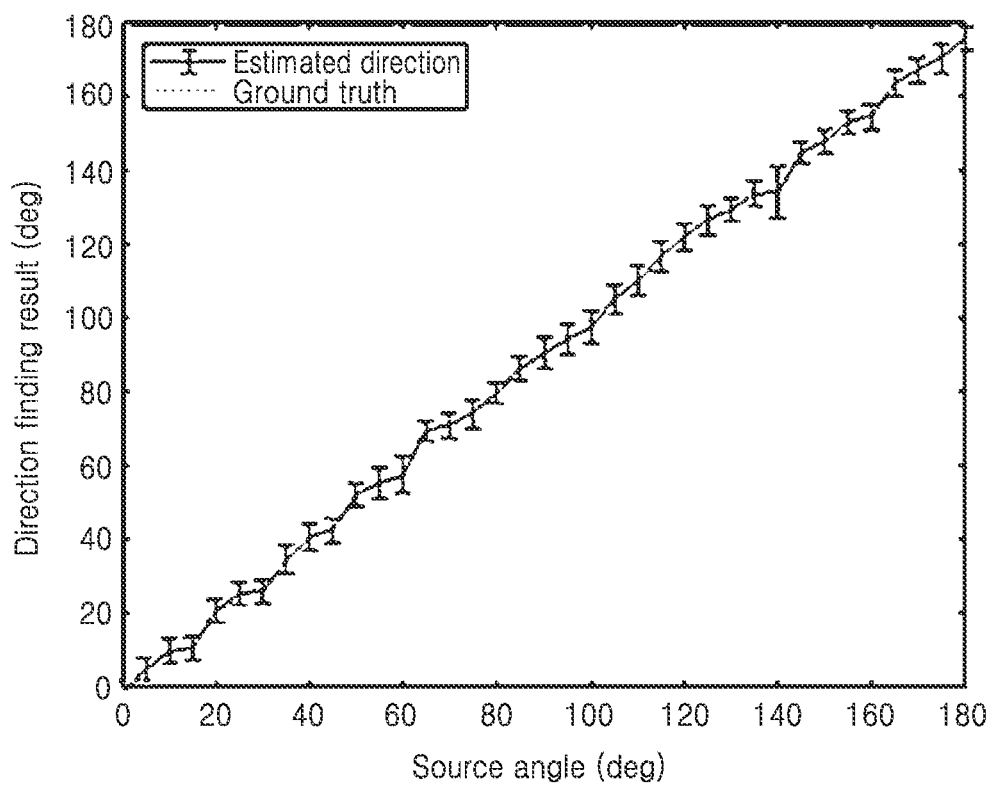
FIG. 16 is a diagram illustrating a result of direction estimation according to an example embodiment.

Tests were conducted while changing a direction of a sound source in a general noise environment by using the direction estimation method according to the example embodiment, and as a result, as illustrated in FIG. 16, a direction may be estimated within an error range of +/−5 degrees by using a 4-channel microphone array having a diameter of 3 cm or less.

Figure 10C:
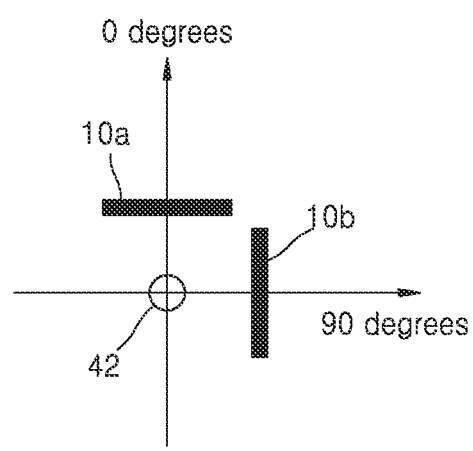

Referring to back FIG. 10C, in an example, the non-directional acoustic sensor 42 is arranged in a center, and two directional acoustic sensors 10a and 10b are arranged to be perpendicular to each other. As the two directional acoustic sensors are arranged perpendicular to each other, an angle for estimating a direction may be calculated based on a trigonometric function. A direction estimation algorithm of a 3-channel array is described with reference to FIG. 14.

Figure 14:
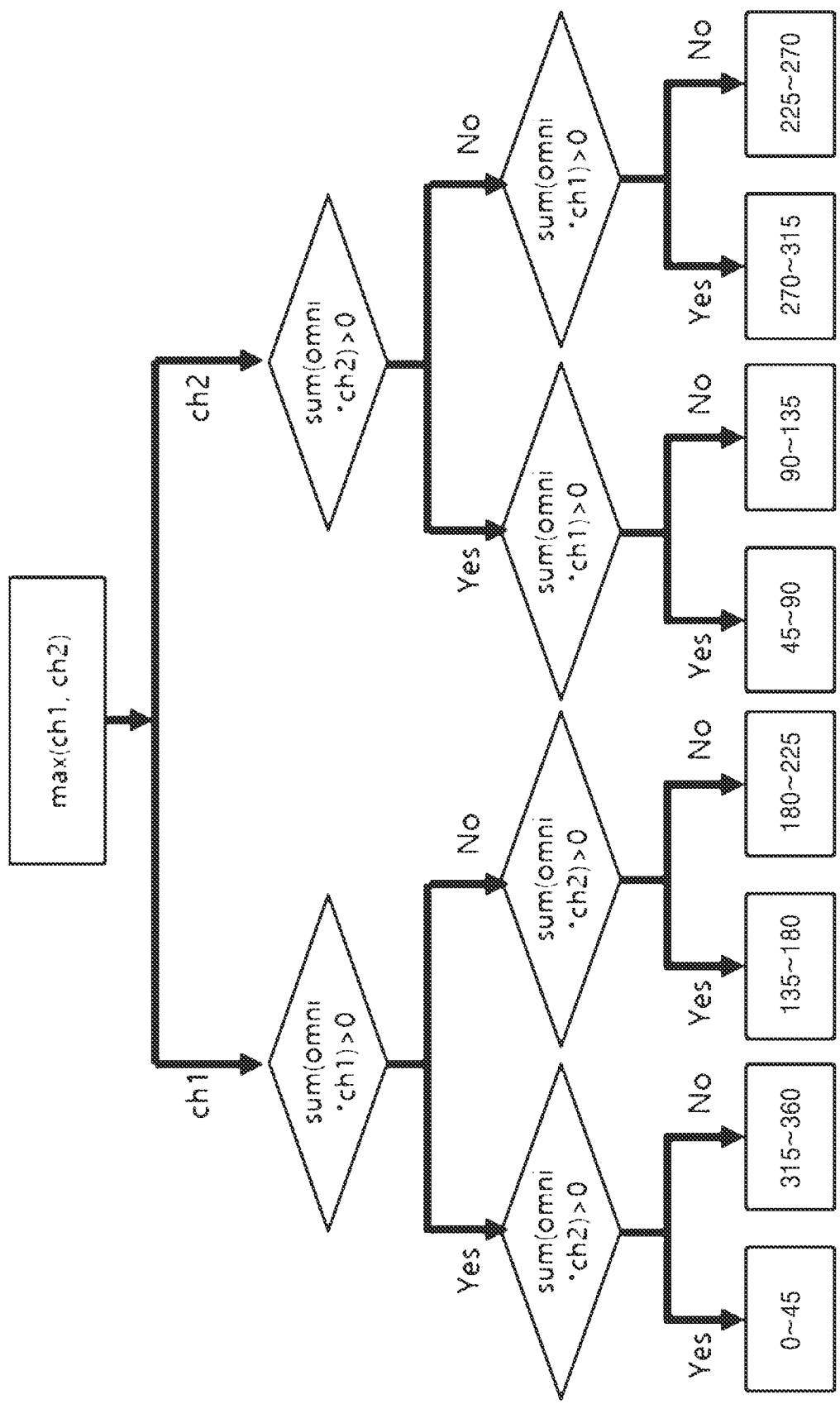

Referring to FIG. 14, a larger channel is determined by comparing powers of two directional acoustic sensors. A phase between the two directional acoustic sensor and the non-directional acoustic sensor is checked.

When a first channel (ch.1) among the two channels is larger, whether a phase of an output signal obtained by adding an output signal of the first channel and an output signal of the non-directional acoustic sensor is greater than 0 is compared. When the phase of the obtained output signal is greater than 0, whether a phase of an output signal obtained by adding an output signal of a second channel (ch.2) and an output signal of the non-directional acoustic sensor is greater than 0 is compared. When the phase of the obtained output signal is greater than 0, a direction of the sound source may be estimated to be between 0 degrees and 45 degrees, and otherwise, the direction of the sound source may be estimated to be between 315 degrees and 360 degrees.

When the phase of the output signal obtained by adding the output signal of the first channel (ch.1) and the output signal of the non-directional acoustic sensor is less than 0, in the same manner, whether an output signal obtained by adding the output signal of the second channel (ch.2) and the output signal of the non-directional acoustic sensor is greater than 0 is compared. When the phase of the obtained output signal is greater than 0, a direction of the sound source may be estimated to be between 135 degrees and 180 degrees, and otherwise, the direction of the sound source may be estimated to be between 180 degrees and 225 degrees.

Similarly, when the second channel (ch.2) is greater among the two channels, a direction of a sound source may be estimated.

After a domain of a direction is determined according to the method described above, an angle or direction may be calculated according to Equation 2.

$$\theta = \cos^{-1} \frac{P_1}{\sqrt{(P_1)^2 + (P_2)^2}} \, (P_1 = \max \textit{ch. power}, P_2 = \min \textit{ch. power})$$

Figure 10D:
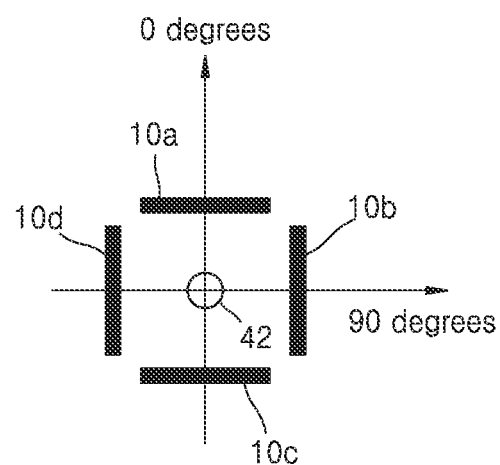

Referring to back FIG. 10D, in an example, the non-directional acoustic sensor 42 is arranged in a center, and four directional acoustic sensors 10a, 10b, 10c, and 10d are arranged. The directional acoustic sensors 10a to 10d are arranged to face each other. In the above arrangement, there are channels facing each other (ch. 1 & ch.3, and ch.2 & ch.4). Here, the channels facing each other have opposite phases. However, when there is an obstacle in an opposite direction, the response magnitude of a directional microphone is slightly reduced, and at −45 degrees to 45 degrees, channel 1 (ch. 1) is larger than channel 3 (ch. 3), and at 135 degrees to 225 degrees, channel 3 (ch.3) is larger than channel 1 (ch.1). A 5-channel direction estimation algorithm using these characteristics is described with reference to FIG. 15.

Figure 15:
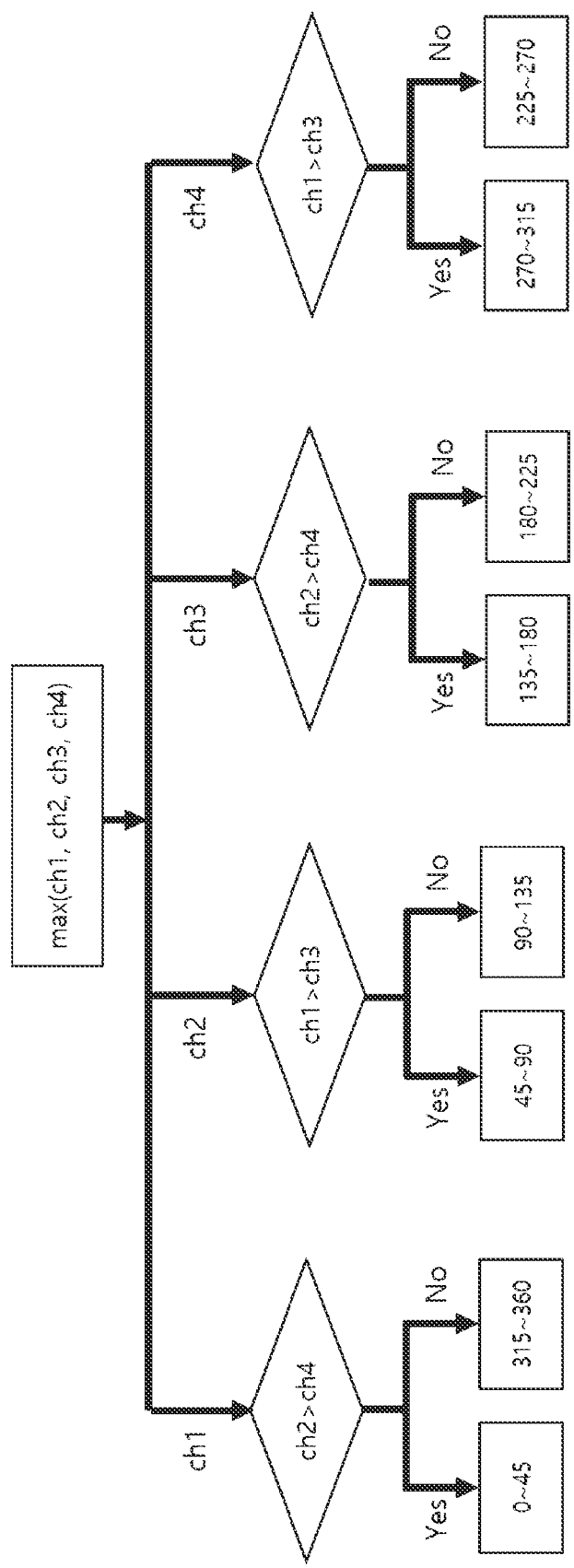

Referring to FIG. 15, a channel having smallest power among four channels is determined. Then, the power of the channel having greatest power and powers of two adjacent channels thereto are compared.

When power of channel 1 (ch.1) is greatest among the four channels, powers of adjacent channels, channel 2 (ch.2) and channel 4 (ch. 4), are compared. When the power of channel 2 (ch. 2) is greater, a direction of a sound source may be estimated to be between 0 degrees and 45 degrees, otherwise, the direction of the sound source may be estimated to be between 315 degrees and 360 degrees.

When power of channel 2 (ch.2) is greatest among the four channels, powers of adjacent channels, channel 1 (ch.1) and channel 3 (ch. 3) are compared. When the power of channel 1 (ch. 1) is greater, a direction of a sound source may be estimated to be between 45 degrees and 90 degrees, otherwise, the direction of the sound source may be estimated to be between 90 degrees and 135 degrees.

Similarly, a direction of a sound source may be estimated also when the power of channel 3 (ch. 3) or channel 4 (ch. 4) is greatest.

After a domain of a direction is determined according to the method described above, an angle or direction may be calculated according to Equation 2 above.

While an arrangement including one non-directional acoustic sensor and two to four directional acoustic sensors is described with reference to FIGS. 10A to 10D, embodiments are not limited thereto, and five or more acoustic sensors may be arranged in various shapes or polygonal shapes. Also, in this case, an algorithm for estimating a direction of a sound source may be variously changed according to the number and arrangement of directional acoustic sensors. For example, a direction of a sound source may be estimated according to the geometric relationship of the directional acoustic sensors in various arrangements.

Figure 17:
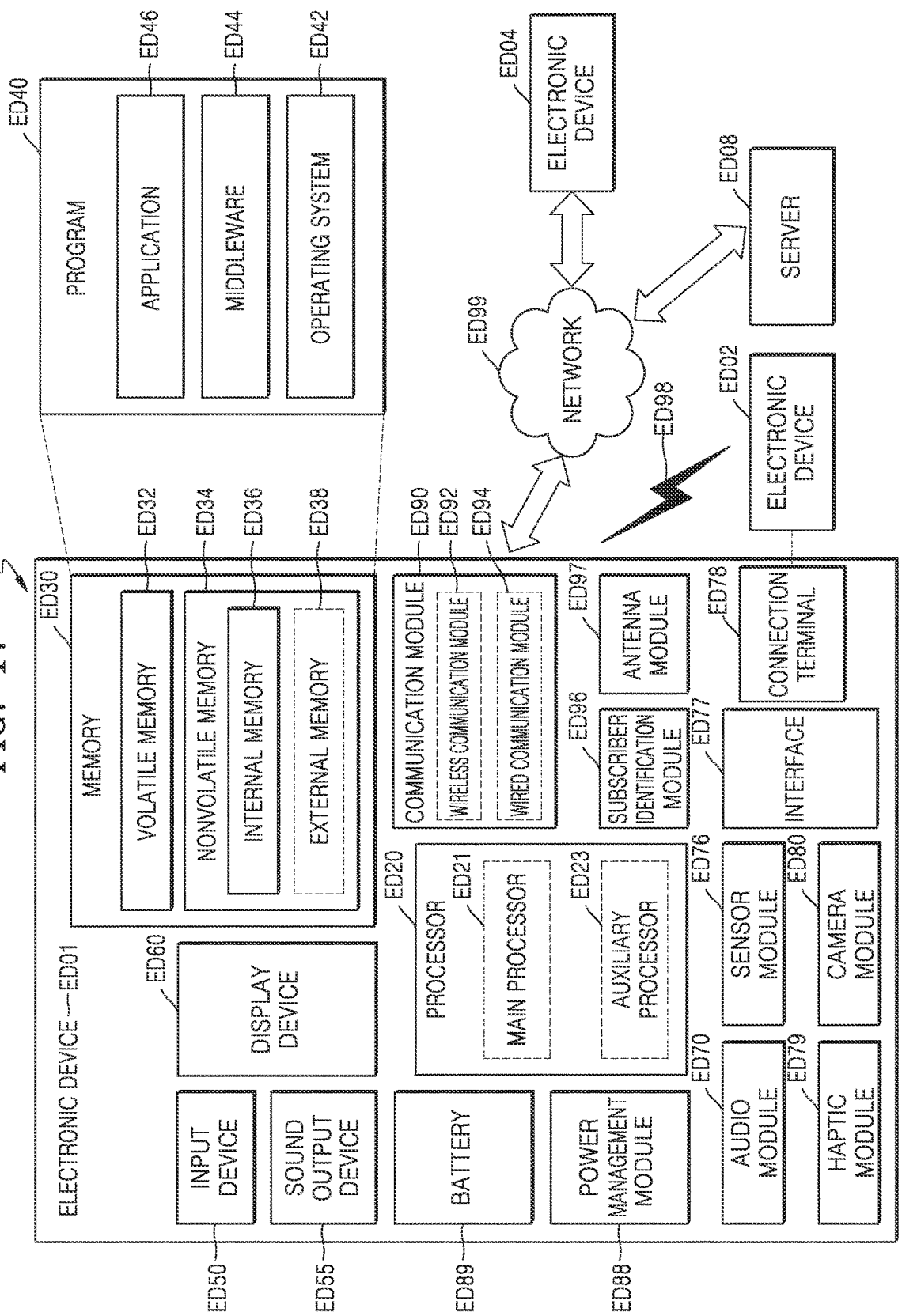
FIG. 17 is a block diagram illustrating a schematic structure of an electronic device including a direction estimating apparatus according to another example embodiment.

FIG. 17 is a block diagram illustrating a schematic structure of an electronic device including a direction estimating apparatus according to another example embodiment.

The direction estimating apparatus described above may be used in various electronic devices. The electronic devices may include, for example, a smartphone, a portable phone, a mobile phone, a personal digital assistant (PDA), a laptop, a personal computer (PC), various portable devices, home appliances, security cameras, medical cameras, automobiles, and Internet of Things (IoT) devices, and other mobile or non-mobile computing devices, and are not limited thereto.

The electronic devices may further include an AP, and may control a plurality of hardware or software components by driving an operating system or an application program through the processor, and may perform various data processing and computations. The processor may further include a GPU and/or an image signal processor.

Referring to FIG. 17, in a network environment ED00, an electronic device ED01 may communicate with another electronic device ED02 through a first network ED99 (e.g., a short-range wireless communication network) or may communicate with another electronic device ED04 and/or a server ED08 through a second network ED99 (e.g., a remote wireless communication network, etc.). The electronic device ED01 may communicate with the electronic device ED04 through the server ED08. The electronic device ED01 may include a processor ED20, a memory ED30, an input device ED50, a sound output device ED55, a display device ED60, an audio module ED70, a sensor module ED76, and an interface ED77, a haptic module ED79, a camera module ED80, a power management module ED88, a battery ED89, a communication module ED90, a subscriber identification module ED96, and/or an antenna module ED97. Some of these components (e.g., the display device ED60) may be omitted from the electronic device ED01 or other components may be added to the electronic device ED01. Some of these components may be implemented as a single integrated circuit. For example, the sensor module ED76 (fingerprint sensor, iris sensor, illuminance sensor, etc.) may be embedded in the display device ED60 (display, etc.).

By executing software (e.g., a program ED40), the processor ED20 may control one or a plurality of other components (hardware, software components, etc.) of the electronic device ED01 connected to the processor ED20 and may perform various data processing or computations. As part of data processing or computations, the processor ED20 may load commands and/or data received from other components (the sensor module ED76, the communication module ED90, etc.), into a volatile memory ED32, process the commands and/or data stored in the volatile memory ED32, and store resultant data in a nonvolatile memory ED34. The processor ED20 may include a main processor ED21 (a CPU, an AP, etc.) and an auxiliary processor ED23 (GPU, an image signal processor, a sensor hub processor, a communication processor, etc.) that may be operated independently of or together with the main processor ED21. The auxiliary processor ED23 may use less power than the main processor ED21 and may perform a specialized function.

The auxiliary processor ED23 may be configured to control functions and/or states related to some of the components of the electronic device ED01 (the display device ED60, the sensor module ED76, the communication module ED90, etc.) by replacing the main processor ED21 while the main processor ED21 is in an inactive state (sleep state), or together with the main processor ED21 when the main processor ED21 is in an active state (application execution state). The auxiliary processor ED23 (an image signal processor, a communication processor, etc.) may be implemented as a portion of other functionally related components (the camera module ED80, the communication module ED90, etc.).

The memory ED30 may store a variety of data required by the components of the electronic device ED01 (the processor ED20, the sensor module ED76, etc.). The data may include, for example, input data and/or output data for software (e.g., the program ED40) and instructions related thereto. The memory ED30 may include a volatile memory ED32 and/or a nonvolatile memory ED34. The nonvolatile memory ED34 may include an internal memory ED36 fixedly mounted in the electronic device ED01 and a removable external memory ED38.

The program ED40 may be stored as software in the memory ED30, and may include an operating system ED42, middleware ED44, and/or an application ED46.

The input device ED50 may receive a command and/or data to be used in a component of the electronic device ED01 (e.g., the processor ED20) from the outside of the electronic device ED01 (a user, etc.). The input device ED50 may include a microphone, a mouse, a keyboard, and/or a digital pen (e.g., a stylus pen).

The sound output device ED55 may output a sound signal to the outside of the electronic device ED01. The sound output device ED55 may include a speaker and/or a receiver. The speaker may be used for general purposes, such as multimedia playback or recording playback, and the receiver may be used to receive incoming calls. The receiver may be integrated as a portion of the speaker or may be implemented as an independent separate device.

The display device ED60 may visually provide information to the outside of the electronic device ED01. The display device ED60 may include a display, a hologram device, or a projector and a control circuit for controlling these devices. The display device ED60 may include touch circuitry configured to sense a touch, and/or sensor circuitry configured to measure intensity of a force generated by the touch (e.g., a pressure sensor).

The audio module ED70 may convert sound into an electrical signal, or conversely, convert an electrical signal into sound. The audio module ED70 may obtain sound through the input device ED50 or output sound through a speaker and/or a headphone of other electronic devices (the electronic device ED02, etc.) directly or wirelessly connected to the sound output device ED55 and/or the electronic device ED01. The audio module ED70 may include the direction estimating apparatus according to an embodiment.

The sensor module ED76 may detect an operating state of the electronic device ED01 (power, temperature, etc.), or an external environmental state (user status, etc.), and generate an electrical signal and/or data corresponding to the sensed state value. The sensor module ED76 may include a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface ED77 may support one or a plurality of designated protocols that may be used to directly or wirelessly connect the electronic device ED01 to another electronic device (e.g., the electronic device ED02). The interface ED77 may include a High Definition Multimedia Interface (HDMI), a Universal Serial Bus (USB) interface, a Secure Digital (SD) card interface, and/or an audio interface.

A connection terminal ED78 may include a connector through which the electronic device ED01 may be physically connected to another electronic device (e.g., the electronic device ED02). The connection terminal ED78 may include an HDMI connector, a USB connector, an SD card connector, and/or an audio connector (e.g., a headphone connector).

The haptic module ED79 may convert an electrical signal into a mechanical stimulus (vibration, movement, etc.) or an electrical stimulus that the user may perceive through tactile or kinesthetic sense. The haptic module ED79 may include a motor, a piezoelectric element, and/or an electrical stimulation device.

The camera module ED80 may capture a still image or record a moving picture. The camera module ED80 may include additional lens assembly image signal processors, and/or flash units. A lens assembly included in the camera module ED80 may collect light emitted from a subject, which is an object of image capturing.

The power management module ED88 may manage power supplied to the electronic device ED01. The power management module ED88 may be implemented as a portion of a power management integrated circuit (PMIC).

The battery ED89 may supply power to components of the electronic device ED01. The battery ED89 may include a non-rechargeable primary cell, a rechargeable secondary cell, and/or a fuel cell.

The communication module ED90 may support establishment of a direct (wired) communication channel and/or a wireless communication channel between the electronic device ED01 and other electronic devices (the electronic device ED02, the electronic device ED04, the server ED08, etc.) and communication through the established communication channel. The communication module ED90 may include one or a plurality of communication processors that operate independently of the processor ED20 (e.g., an AP) and support direct communication and/or wireless communication. The communication module ED90 may include a wireless communication module ED92 (a cellular communication module, a short-range wireless communication module, a global navigation satellite system (GNSS, etc.) communication module and/or a wired communication module ED94 (a local area network (LAN) communication module, a power line communication module, etc.). Among these communication modules, a corresponding communication module may communicate with other electronic devices through a first network ED98 (a short-range communication network such as Bluetooth, WiFi Direct, or Infrared Data Association (IrDA)) or a second network ED99 (a telecommunication network such as a cellular network, the Internet, or a computer network (LAN, WAN, etc.)). These various types of communication modules may be integrated into a single component (a single chip, etc.) or implemented as a plurality of components (multiple chips) that are separate from each other. The wireless communication module ED92 may confirm and authenticate the electronic device ED01 in a communication network, such as the first network ED98 and/or the second network ED99, by using subscriber information (e.g., International Mobile Subscriber Identifier (IMSI)) stored in the subscriber identification module ED96.

The antenna module ED97 may transmit or receive signals and/or power to or from the outside (e.g., other electronic devices). An antenna may include a radiator including a conductive pattern formed on a substrate (e.g., a printed circuit board (PCB)). The antenna module ED97 may include one or a plurality of antennas. When a plurality of antennas are included, an antenna suitable for a communication method used in a communication network, such as the first network ED98 and/or the second network ED99, may be selected by the communication module ED90 from among the plurality of antennas. A signal and/or power may be transmitted or received between the communication module ED90 and another electronic device through the selected antenna. In addition to the antenna, other components (e.g., a radio frequency integrated circuit (RFIC)) may be included as a portion of the antenna module ED97.

Some of the components may be connected to each other through a communication method between peripheral devices (e.g., a bus, General Purpose Input and Output (GPIO), Serial Peripheral Interface (SPI), Mobile Industry Processor Interface (MIPI)) and exchange signals (e.g., command, data, etc.).

A command or data may be transmitted or received between the electronic device ED01 and the external electronic device ED04 through the server ED08 connected to the second network ED99. The other electronic devices ED02 and ED04 may be of the same type as or a different type from that of the electronic device ED01. All or some of operations performed by the electronic device ED01 may be executed in one or a plurality of devices among the other electronic devices ED02, ED04, and ED08. For example, when the electronic device ED01 is to perform a function or service, instead of executing the function or service by itself, a request for performing a portion or all of the function or service may be made to one or a plurality of other electronic devices. One or a plurality of other electronic devices receiving the request may execute an additional function or service related to the request, and transmit a result of the execution to the electronic device ED01. To this end, cloud computing, distributed computing, and/or client-server computing technology may be used.

FIGS. 18 to 21 are example diagrams illustrating applications of various electronic devices to which the direction estimating apparatus according to another example embodiment may be applied.

As various electronic devices include the direction estimating apparatus according to an example embodiment, sound may be obtained by using a certain directional pattern with respect to a certain direction, a direction of transmitted sound may be detected, or sound around the electronic device may be obtained with spatial awareness. For example, when a first user and a second user have a conversation by using an electronic device as a medium, the electronic device may detect a direction in which each user is located, or sense only the voice of the first user by using a directional pattern oriented toward the first user, or sense only the voice of the second user by using a directional pattern oriented toward the second user, or simultaneously sense the voices of both users by distinguishing directions from which each user's voice is heard.

A direction estimating apparatus mounted on an electronic device has uniform sensitivity to various frequencies of sensed sound, and it may be easier to manufacture the direction estimating apparatus having a compact size as there is no restriction on distances between respective acoustic sensors. Also, the degree of freedom of operation of the apparatuses is relatively high because various directional patterns may be selected and combined according to a location of a direction estimating apparatus or the conditions of the surroundings. In addition, only simple operations such as a sum or a difference are used to control the direction estimating apparatus, and thus computational resources may be used more efficiently.

Figure 18:
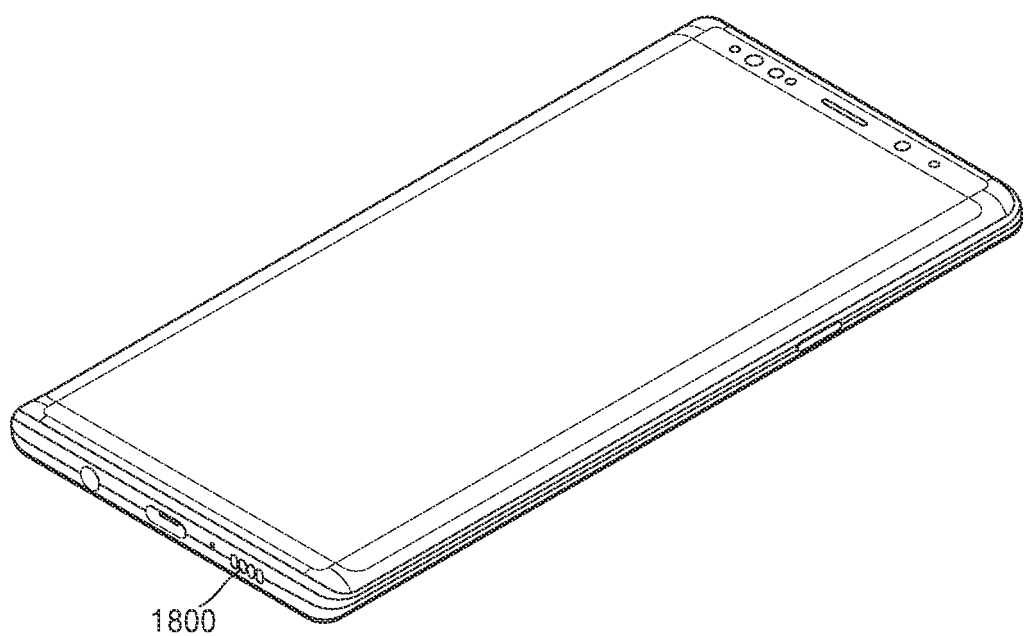
FIGS. 18, 19, 20, and 21 are example diagrams illustrating applications of various electronic devices to which the direction estimating apparatus according to another example embodiment may be applied.
Figure 19:
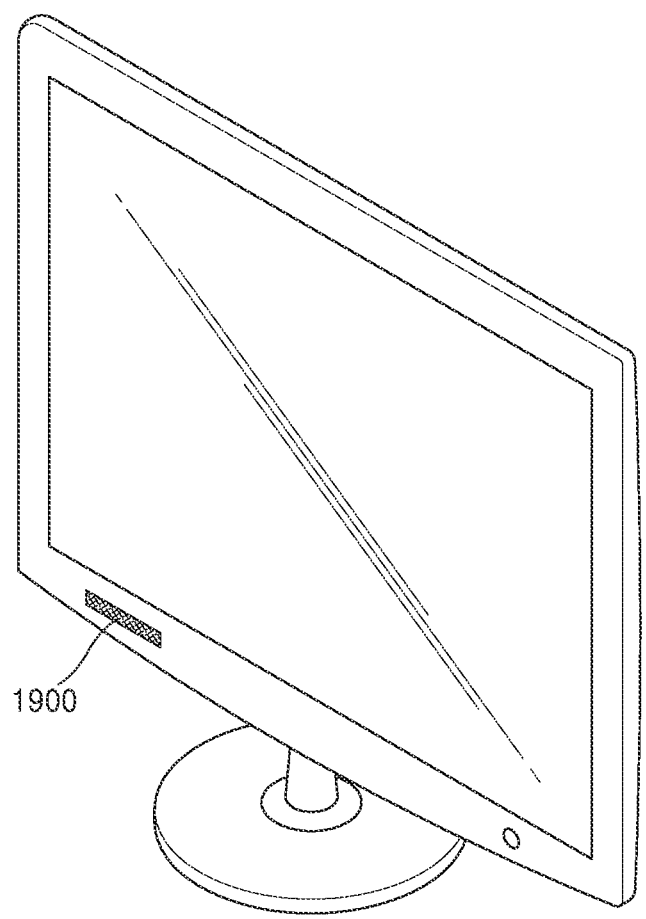

The direction estimating apparatus according to the example embodiments may be a microphone module 1800 provided in a mobile phone or smartphone illustrated in FIG. 18, or a microphone module 1900 provided in a TV illustrated in FIG. 19.

Figure 20:
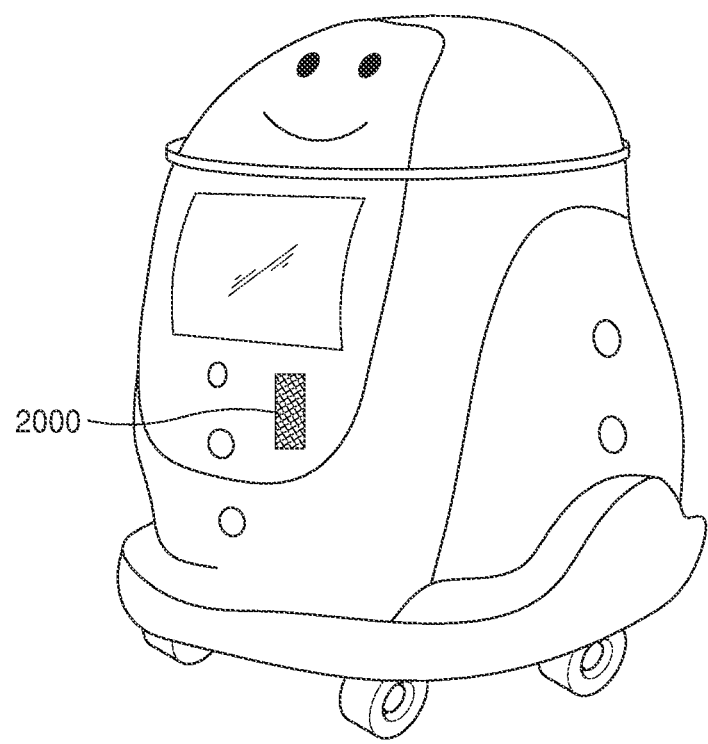
Figure 21:
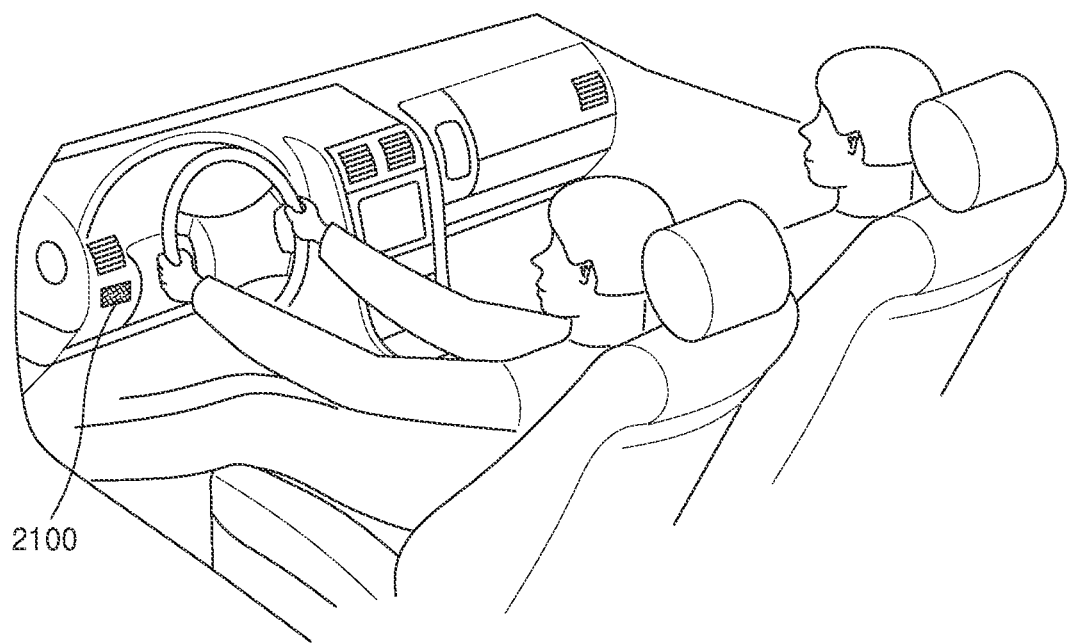

In addition, the direction estimating apparatus may be a microphone module 2000 provided in a robot illustrated in FIG. 20 or a microphone module 2100 provided over the overall length of a vehicle illustrated in FIG. 21.

Although the direction estimating apparatus described above and an electronic device including the same have been described with reference to the embodiment illustrated in the drawings, this is merely an example, and it will be understood by those of ordinary skill in the art that various modifications and equivalent other embodiments may be made. Therefore, the disclosed example embodiments should be considered in an illustrative rather than a restrictive sense. The scope of the present disclosure is defined not by the detailed description of the present disclosure but by the appended claims, and all differences within the scope will be construed as being included in the present disclosure.

The embodiments described above can be written as computer programs and can be implemented in general-use digital computers that execute the programs using a computer-readable recording medium. Also, data structures used in the example embodiments described above may be written to the computer-readable recording medium using various means. Examples of the computer-readable recording medium include magnetic storage media (e.g., ROM, floppy disks, hard disks, etc.), optical recording media (e.g., CD-ROMs, or DVDs), and storage media such as carrier waves (e.g., transmission through the Internet).

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. A direction estimating apparatus using an acoustic sensor, the direction estimating apparatus comprising:
   an omni-directional acoustic sensor;
   a plurality of directional acoustic sensors provided adjacent to the omni-directional acoustic sensor, the plurality of directional acoustic sensors comprising a first directional acoustic sensor and a second directional acoustic sensor; and
   a processor configured to:
      obtain a first output signal from the omni-directional acoustic sensor and a plurality of second output signals from the plurality of directional acoustic sensors, the plurality of second output signals comprising a first second output signal from the first directional acoustic sensor and a second second output signal from the second directional acoustic sensor; and
      estimate a direction of a sound source within an error range from −5 degrees to +5 degrees based on a comparison of a first magnitude of the first second output signal and a second magnitude of the second second output signal and based on phase information between the first output signal and one of the plurality of second output signals.

2. The direction estimating apparatus of claim 1, wherein the plurality of directional acoustic sensors comprise three directional acoustic sensors provided in a triangular shape or radial shape with respect to the omni-directional acoustic sensor.

3. The direction estimating apparatus of claim 1, wherein the processor is further configured to:
   exclude a second output signal having a smallest magnitude from among the plurality of second output signals; and
   obtain the phase information by adding the first output signal and one or more of the plurality of second output signals other than the excluded second output.

4. The direction estimating apparatus of claim 3, wherein the processor is further configured to:
   select a second output signal having a greatest magnitude when based on the other one or more of the plurality of second output signals being plural; and
   obtain the phase information by adding the first output signal and the selected second output signal.

5. The direction estimating apparatus of claim 1, wherein the processor is further configured to compare whether the phase information between the first output signal and the one of the plurality of second output signals is greater than 0.

6. The direction estimating apparatus of claim 1, wherein the direction of the sound source is differently estimated based on a number of the plurality of directional acoustic sensors and arrangement of the plurality of directional acoustic sensors.

7. The direction estimating apparatus of claim 1, wherein a directional shape of the plurality of second output signals includes a figure-of-8 shape regardless of a frequency of the sound source.

8. The direction estimating apparatus of claim 1, wherein the processor is further configured to:
   obtain, when the plurality of directional acoustic sensors are three, the direction of the sound source according to:

$$\theta = \sum_{i=0}^{3} c_i \cdot r^i,$$

where $C_i$ is an arbitrary coefficient, and $r_i$ is a power factor.

9. The direction estimating apparatus of claim 1, wherein the processor is further configured to:
   obtain the phase information by adding a second output signal having a greater magnitude among the first second output signal and the second second output signal, and the first output signal of the omni-directional acoustic sensor; and
   compare whether the phase information is greater than 0.

10. The direction estimating apparatus of claim 9, wherein the processor is further configured to obtain the direction of the sound source according to:

$$\theta = \cos^{-1} \frac{P_1}{\sqrt{(P_1)^2 + (P_2)^2}},$$

where P1 is greatest power, and P2 is smallest power.

11. The direction estimating apparatus of claim 9, wherein the two directional acoustic sensors are provided to be perpendicular to each other.

12. The direction estimating apparatus of claim 1, wherein the processor is further configured such that, when the plurality of directional acoustic sensors are four, each two directional acoustic sensors are provided to face each other.

13. The direction estimating apparatus of claim 12, wherein the processor is further configured to:
   determine a directional acoustic sensor corresponding to a second output signal having a greatest magnitude among the plurality of second output signals; and compare a magnitude of the determined directional acoustic sensor with magnitudes of second output signals of two adjacent directional acoustic sensors provided on a left side and a right side.

14. The direction estimating apparatus of claim 1, wherein the omni-directional acoustic sensor and the plurality of directional acoustic sensors are provided within a diameter of 3 cm.

15. An electronic device comprising:
a direction estimating apparatus using an acoustic sensor comprising:
an omni-directional acoustic sensor;
a plurality of directional acoustic sensors provided adjacent to the omni-directional acoustic sensor, the plurality of directional acoustic sensors comprising a first directional acoustic sensor and a second directional acoustic sensor; and
a processor configured to:
obtain a first output signal from the omni-directional acoustic sensor and a plurality of second output signals from the plurality of directional acoustic sensors, the plurality of second output signals comprising a first second output signal from the first directional acoustic sensor and a second second output signal from the second directional acoustic sensor; and
estimate a direction of a sound source within an error range from −5 degrees to +5 degrees based on a comparison of a first magnitude of the first second output signal and a second magnitude of the second second output signal and based on phase information between the first output signal and one of the plurality of second output signals.

16. A direction estimation method using an acoustic sensor, the direction estimation method comprising:
obtaining a first output signal from an omni-directional acoustic sensor and a plurality of second output signals from a plurality of directional acoustic sensors, the plurality of directional acoustic sensors comprising a first directional acoustic sensor and a second directional acoustic sensor and the plurality of second output signals comprising a first second output signal from the first directional acoustic sensor and a second second output signal from the second directional acoustic sensor; and
estimating a direction of a sound source within an error range of −5 degrees to +5 degrees based on a comparison of a first magnitude of the first second output signal and a second magnitude of the second second output signal and based on phase information between the first output signal and one of the plurality of second output signals.

17. The direction estimation method of claim 16, wherein the plurality of directional acoustic sensors comprise three directional acoustic sensors provided in a triangular shape or radial shape with respect to the omni-directional acoustic sensor.

18. The direction estimation method of claim 16, wherein the plurality of directional acoustic sensors comprise two directional acoustic sensors provided perpendicular to each other or four directional acoustic sensors, each two of which are provided to face each other.

19. The direction estimation method of claim 17, further comprises:
excluding a second output signal having a smallest magnitude from among the plurality of second output signals; and
obtaining the phase information by adding the first output signal and one or more of the plurality of second output signals other than the excluded second output signal.

20. The direction estimation method of claim 19, further comprises:
selecting a second output signal having a greatest magnitude based on the one or more of the plurality of second output signals being plural; and
obtaining the phase information by adding the first output signal and the selected second output signal.

* * * * *